INVENTORS
JAMES W. BRYCE
JOHN N. WHEELER
BY
ATTORNEY

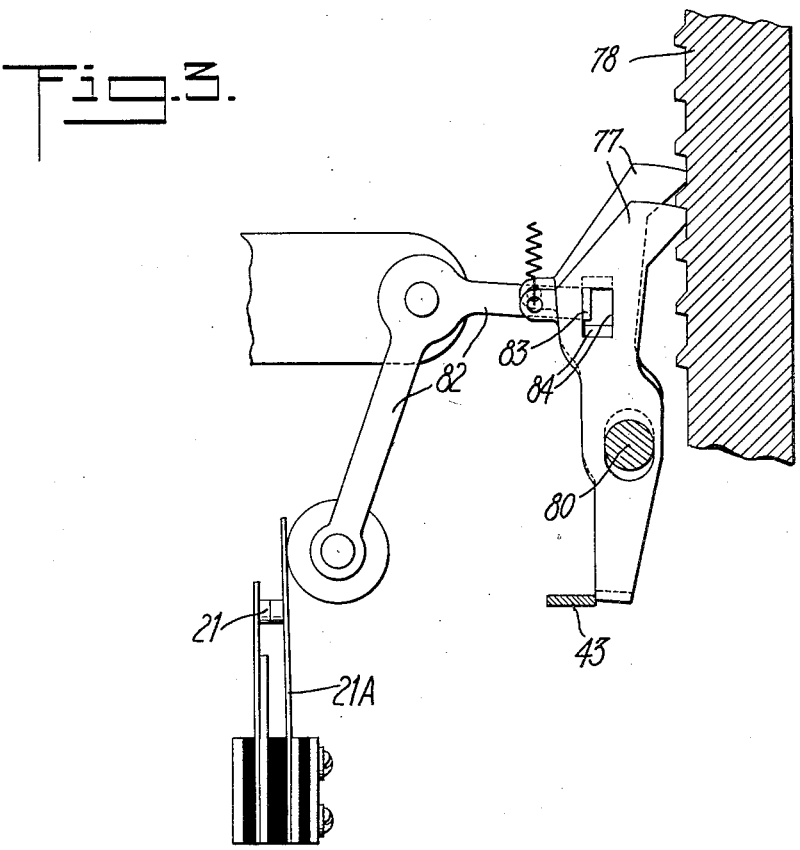

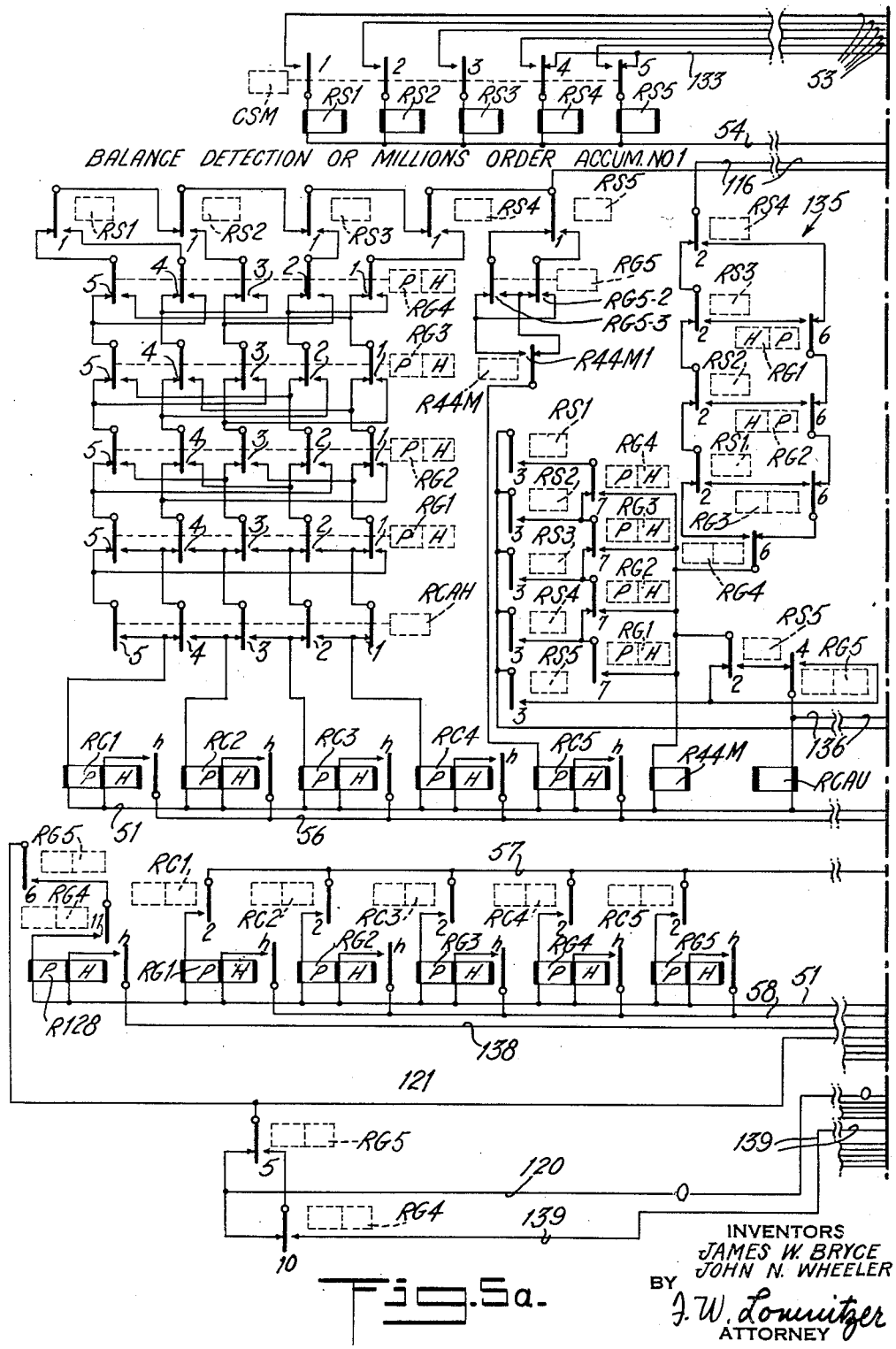

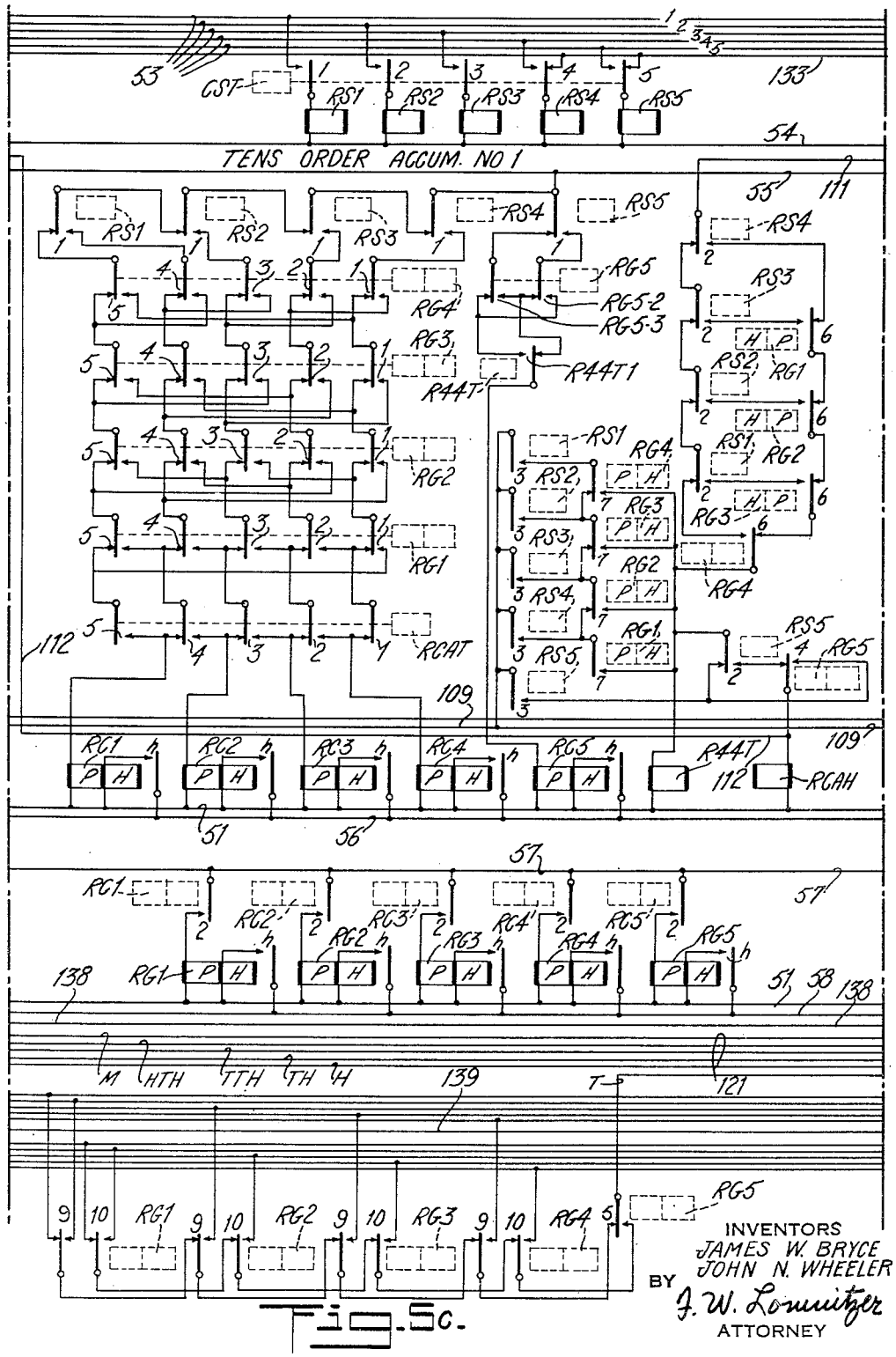

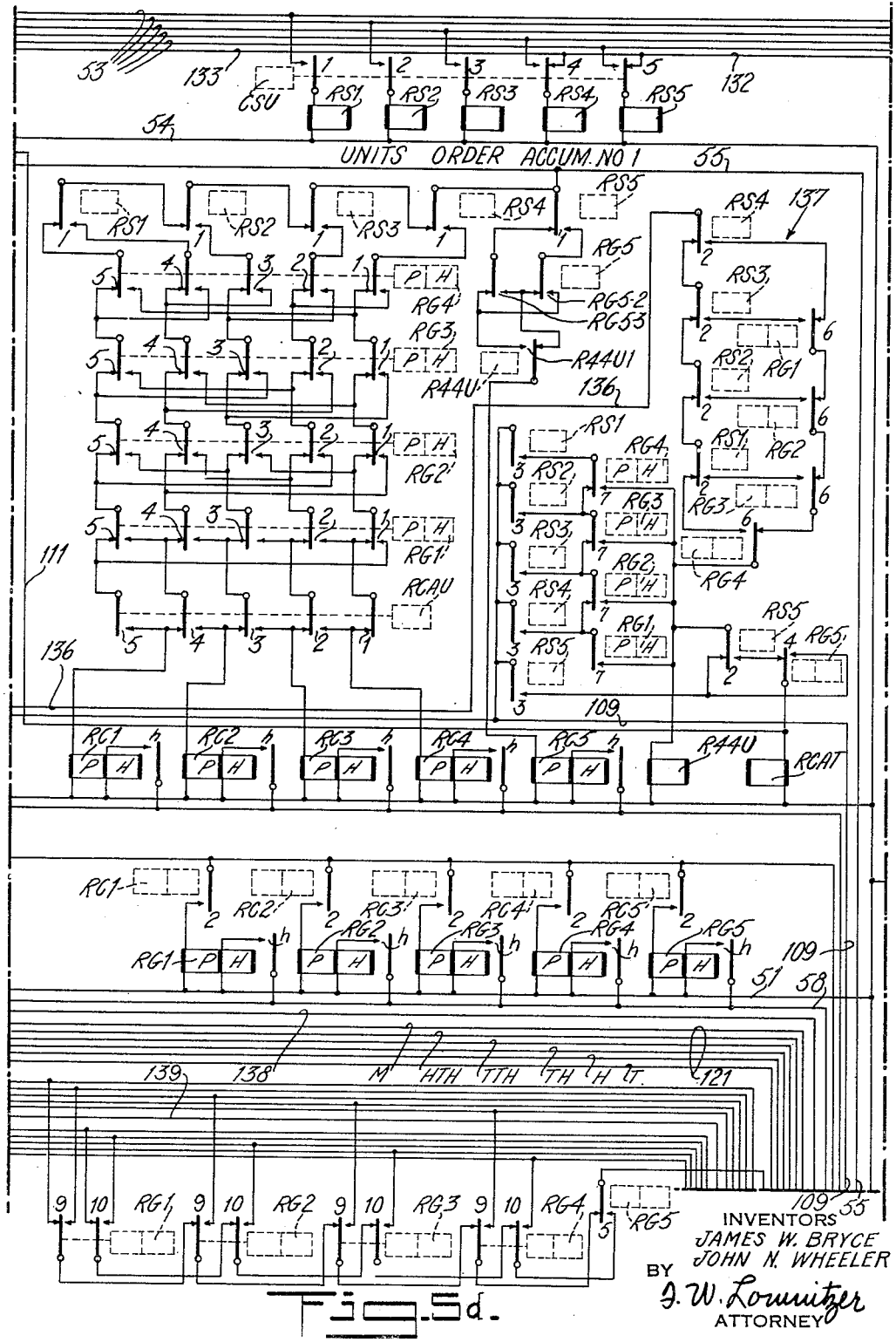

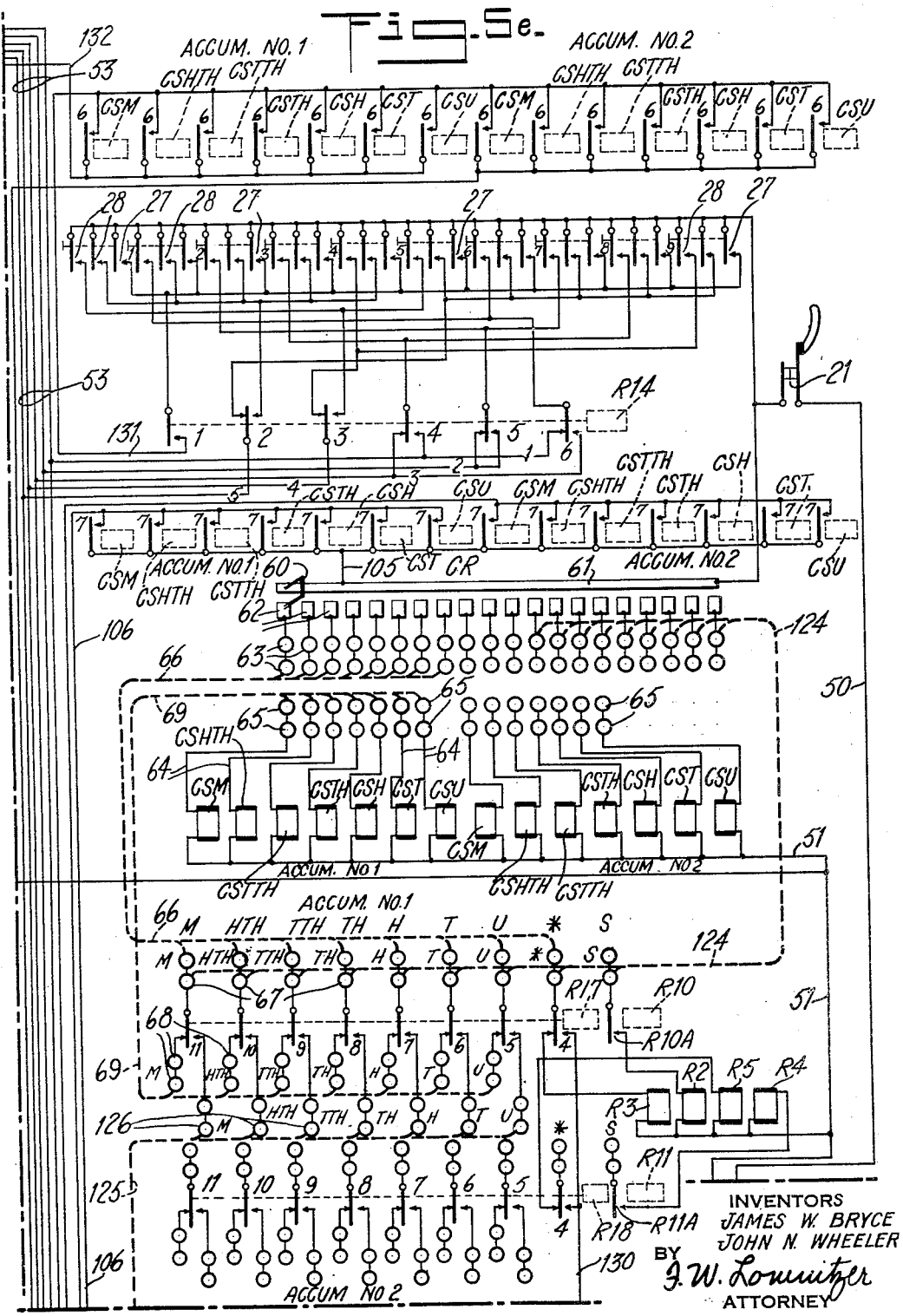

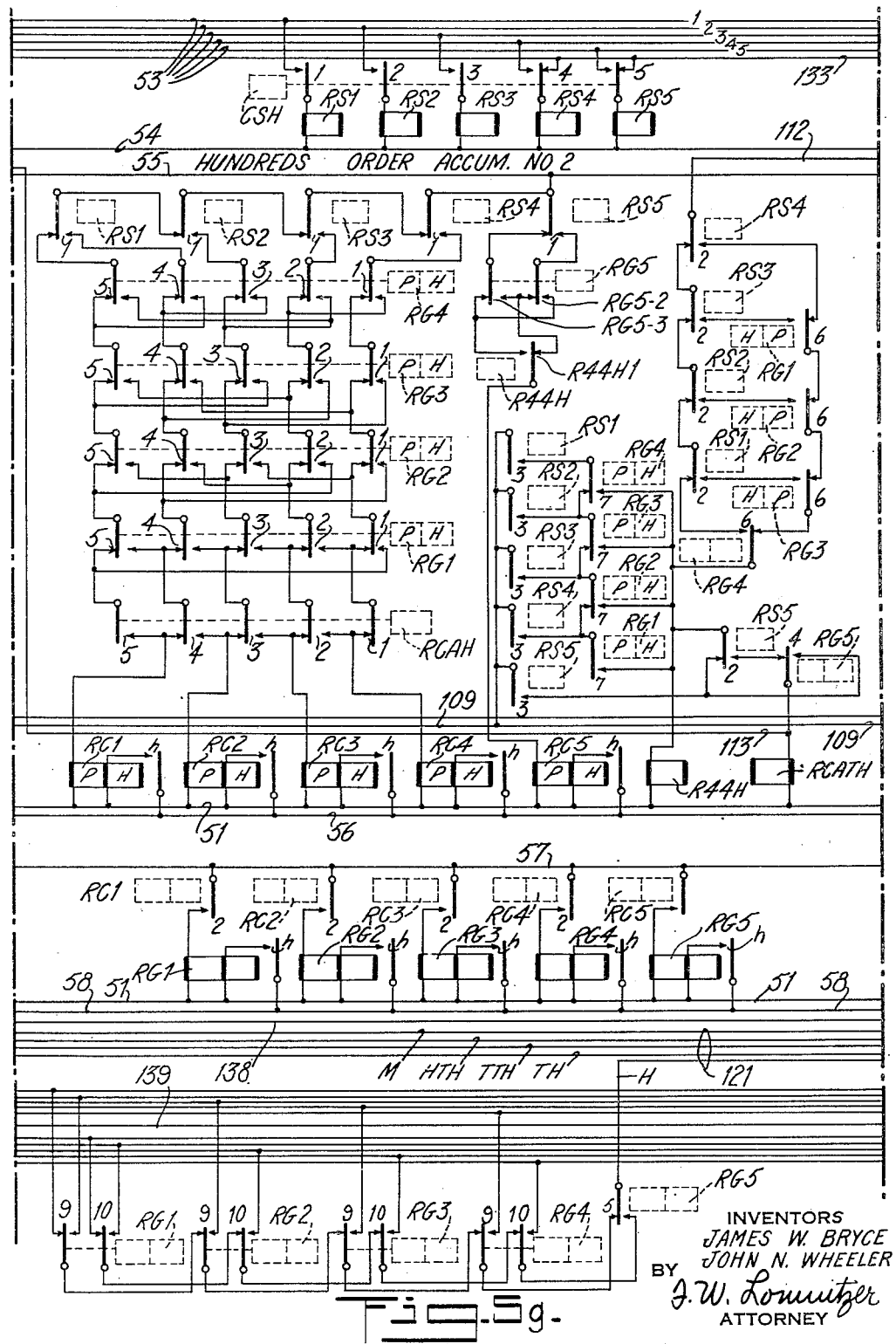

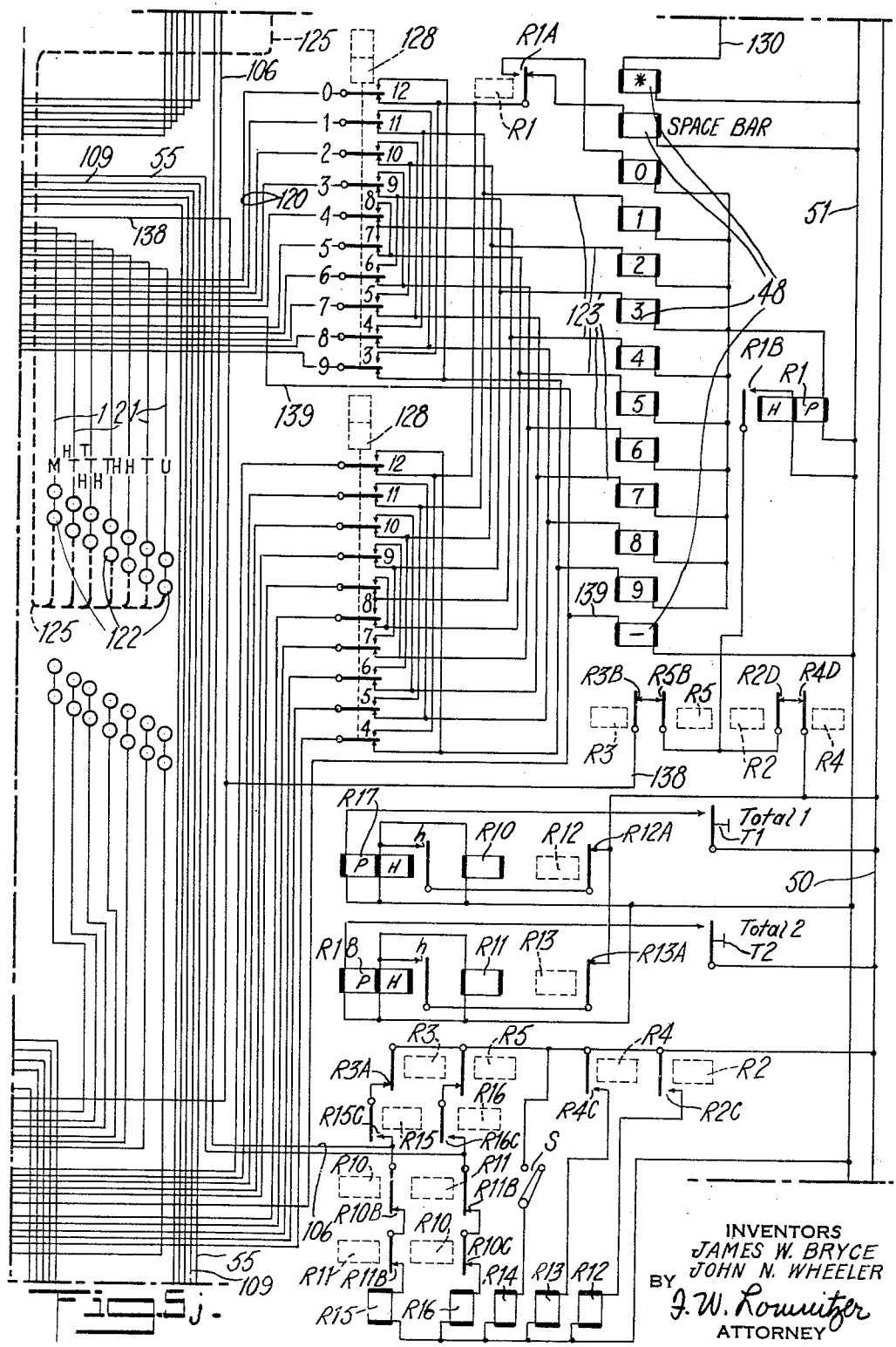

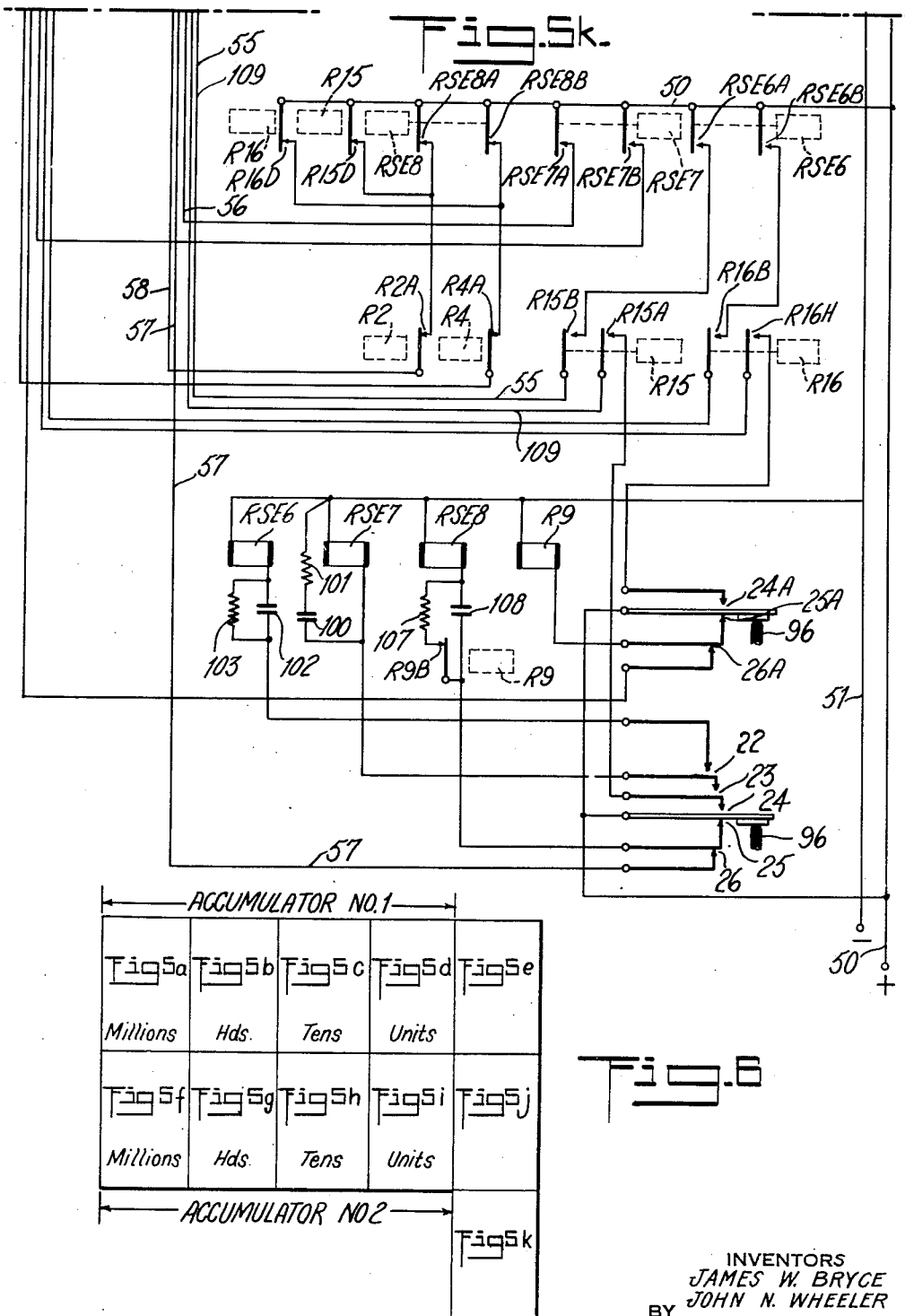

UNITED STATES PATENT OFFICE 2,551,093

COMBINED TYPEWRITER AND COMPUTING MACHINE WITH ACCUMULATORS OF THE RELAY TYPE

James W. Bryce, Glen Ridge, N. J., and John N. Wheeler, Hawthorne, N. Y., assignors to International Business Machines Corporation, New York, N. Y., a corporation of New York Application September 24, 1947, Serial No. 775,880

12 Claims. (Cl. 235—59)

This invention relates to combined typewriting and computing machines and more particularly to the type in which entries are made under control of the keyboard of the typewriter, either positively or negatively, and the balances and totals are automatically printed by the typewriting mechanism.

Machines of this general type are well known but the computing portion of the apparatus usually employs accumulators of the wheel type, requiring mechanical movements which take differential lengths of time to effect entries. The entries in accumulators of this type require time and are generally slower in operation than the operation of the typewriter. Such types of wheel accumulators have been arranged to control the printing of totals by using the typewriting mechanism but again such machines require complicated mechanisms for reading of the totals to select the keys of the keyboard, thereby slowing down the total printing operation. Also, such forms of combined typewriter and computing machines do not have the desirable feature of selectivity with respect to selecting different accumulators, determining the positions for printing items or totals, and in order to attain this requirement it was almost necessary to reconstruct the whole apparatus or have the operator make complicated mechanical adjustments in the machine. This feature of selectivity is important because it enables items to be entered and totals to be printed at desired places on the work form, and different accumulators selected, since the work forms vary considerably in the bookkeeping and accounting requirements.

An improved combined typewriting and computing machine constructed according to this invention employs an accumulator of the relay type in which entries are made solely by electrical impulses transmitted over digit lines and ultimately set up in storage register relays. Since electrical impulses are handled only and they are short in their time of transmission, accumulators of this type are rapid in their setting operation and also in their reading-out operation for total printing operations. In fact, relay accumulators of this general type are so rapid that entries can be effected as fast as the keys are operated. Again, in reading out the totals from the accumulator the speed of operation is solely determined by the length of time that the typing mechanism operates rather than by the electrical reading out of the digits represented in the accumulator orders.

The provision of an accumulator of this relay electrical type lends itself to a principal feature of the invention, that is, entries can be effected at desired platen locations and totals can also be printed at desired platen locations.

Another feature of the invention resides in the provision of a plurality of accumulators which can be so coordinated with the keyboard through a column readout arrangement that by suitable plug connections items can be selectively entered in these accumulators by classes of items, or an accumulator may be utilized as a grand total accumulator. The plugboard arrangement herein shown gives the greatest degree of selectivity to determine the places of imprint on the work sheet, the particular accumulators operated at such location, etc., all of which satisfies the varied needs of bookkeeping and accounting operations.

A relatively important feature of the present invention is to interlock the transmission of digit entries in the accumulator so that they are successively entered under control of the platen carriage of the typewriter. The latter has a coordinated column readout structure of commutator form which directs entries in succession to the various orders of the accumulator as the platen carriage spaces the work sheet. Hence, it is not possible by virtue of such interlock apparatus to effect an entry in the next order of the accumulator until the platen carriage has been spaced to the corresponding typing position.

Another feature concerns the provision of reading out total digits from the accumulator orders in succession under control of said column readout. By virtue of this column readout the next digit of the total cannot be printed until the preceding digit has been printed upon the work sheet and the platen carriage spaced to the next blank position. By means of the column readout the typing mechanism is called into operation successively under control of the accumulator orders.

A relatively important feature of the invention is to utilize a reciprocating part of the typewriter for closing contacts in a predetermined sequence, thus controlling the energizing circuits by a timed operation as is required to pick up relays and hold relays energized and at a certain time, and drop others out. The absence of rotatable parts in the types that could be useful for such purpose makes it possible by the above arrangement to coordinate the relay accumulator with the typewriter keyboard without the use of complicated parts or radically changing the typewriter.

Another feature or object of the invention pertains to the novel electrical circuits coordinated with such contacts whereby their effect can be extended or controlled independently of the sequential closure of the contacts by the reciprocating part of the typewriter. It has been found that while the contacts may be closed in a predetermined sequence it is desirable to hold circuits closed longer or open at a different time independently of these contacts. More specifically this is attained in some instances by having relays energized through such contacts by charging a condenser. The charge or dissipation of the charging current by cutting in resistors actually controls the time for energizing or opening such circuits independently of the closure or opening of the aforesaid contacts.

Still other features of the machine pertain to the construction of the relay accumulator wherein simplicity and reduction in the number of relays required for each order are obtained by setting up relays in coded combinations; enabling units carries to be made from order to order as required; to enable entry of amounts in the accumulator negatively, preferably by the complemental process; have provisions for detecting negative balances; and to enable the printing of negative balances when detected as a true number balance with its appropriate sign characterization.

Other objects of the invention will be pointed out in the following description and claims and illustrated in the accompanying drawings, which disclose, by way of example, the principle of the invention and the best mode, which has been contemplated, of applying that principle.

In said drawings:

Fig. 3 is a sectional view taken on the line 3—3 of Fig. 1 showing the manner in which the escapement mechanism controls certain contacts utilized in the electrical circuits.

Fig. 4 is a timing diagram of certain electrical contacts.

Figs. 5a–5k when attached together according to the diagram of Fig. 6 represent the complete electrical circuits of the machine, with the exception that in the relay accumulators the thousands, tens and hundreds of thousands orders are not shown.

Fig. 6 is a diagram shown in the manner of assembling the sheets of the wiring diagram.

*The typewriter*

The invention is preferably shown in connection with a commercial form of typewriter constructed as shown in Patents Nos. 1,777,055 and 1,873,512 which is now on the market.

Figures 1, 2:
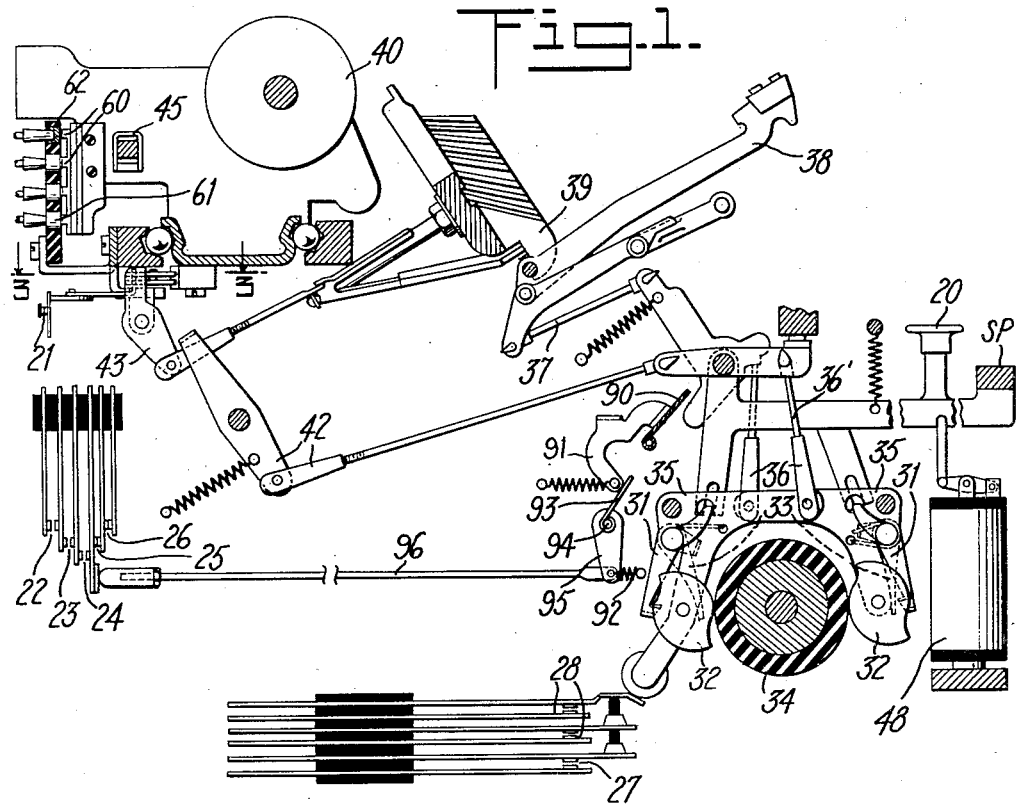
Fig. 1 is a central sectional view of the well known form of typewriter which has been selected as the preferred form of typewriter coordinated with the improved relay computing mechanism.
Fig. 2 is a plan view of the keyboard of said typewriter.

Fig. 2 shows the keyboard comprising the usual alphabet keys and to the rear of which are a series of ten digit keys 20, 9 to 0 which are involved in the present invention for entering digital values in accumulators. In another embodiment other digit keys of a separate keyboard may be used, but the digit keys of the typewriter are preferable because they simultaneously type the digit values on the work sheet or form around the typewriter platen as the digit entries are made.

The keyboard of the typewriter also includes functional keys such as CR for carriage return and platen line spacing, TAB, the tabulating key, bar SP, the space bar, a — key for printing a minus sign for a negative total, a * key for identifying totals, these regular keys being the principal ones used in connection with the present invention.

Besides the above described manually operated parts, the typewriter is equipped with a toggle lever switch S to condition the machine for subtraction of entries in the selected accumulator as the digit keys 20 are depressed, and two depressible keys T1 and T2 for initiating taking of the totals from the related accumulator #1, or the accumulator #2.

Operated by certain operating parts of the typewriter are contacts used in the electrical circuits, these generally being escapement contacts 21 which are actuated by the escapement mechanism, a series of contacts 22, 23, 24, 25, 26 which are operated by the ribbon shift mechanism, and a column readout CR (Fig. 5e), the movable element of which is moved column by column by the typewriter carriage as it moves step by step. The column readout is used to cause successive digital entries in the selected accumulator at desired positions of the typewriter carriage, and for also causing the totals from either accumulator to be automatically typed by the type bars as the typewriter carriage reaches predetermined positions. The construction and operation of such elements will be described in detail as their need is required in the ensuing description.

Each of the ten digital keys 20 closes three contacts 27, 28 to effect digital entries, contacts 28 being used for addition and contacts 27 and 28 for subtraction. Any suitable means may be employed to close these contacts but is preferably by the arrangement shown in Fig. 1.

Briefly, since the mechanism is well known in the form of typewriter referred to, each digit key 20 releases a latch 31 from a cam 32, permitting a spring-pressed lever 33 to move the cam 32 against the periphery of a continuously motor-driven roller 34. The cam 32 is rotated by contact with the roller 34, causing the carrier 35 of the cam 32 to rock in a direction to pull down a link 36. The elements above are known as a "cam unit." Link 36 through a linkage 37 propels the type bar 38 carried by the basket 39 towards the platen 40 to effect typing from the type denoted by the operated key. During the final increment of movement of the type bar 38, it strikes a universal bar 42 to actuate the escapement lever 43 for releasing the escapement mechanism to effect a carriage spacing movement. In the operation of the escapement mechanism, the latter by means to be described opens and closes the escapement contacts 21. This is the operation which is effected by the digit typing keys.

Depression of space bar SP similarly results in the downward movement of link 36' to operate linkage 42 for actuating the escapement lever 43 to effect a carriage or letter-spacing movement.

The carriage return mechanism operated by key CR is of the type disclosed in Patent No. 1,955,614. As is usual, the carriage return movement is accompanied by a line spacing operation.

The tabulating mechanism operated by the key TAB is such as is shown in Patent No. 1,935,436 and includes the usual settable tabulator stops 45.

*Means to effect automatic operation of digit keys in typing totals*

Supplementing the above described construction in the typewriter and useful in the present invention for effecting automatic operation of the digit keys to type totals are solenoids 48, one for each of the digit keys 0-9, the * key, and the — key. Each solenoid has a link connection to pull down the corresponding key when it is energized, and the pulled down key will be operated in the same manner to effect its function just as if the key was manually depressed. There is also provided a solenoid 48 to operate the space bar which is automatically actuated when no typing is to be effected and only carriage spacing movements to thus suppress 0 typing for left hand zeros in the printed total, as will be described.

Plugboard

It is most desirable that accumulator entries be effected at certain typing positions of the typewriter carriage, in either accumulator or both, and that totals be typed at other positions of the carriage under control of either selected accumulator. This requirement comes about because of the wide variations in typing forms, such as bills, or statements. In the present arrangement, the typewriter carriage is the primary control element and has associated therewith a column readout and a plugboard having selective plug connections by means of which digital entries are initiated at certain platen positions, and total typing is effected at certain other positions. These electrical plug connections are possible because of the incorporation of electrically controlled accumulators, preferably of the relay type. The all-electrical embodiment makes a very selective arrangement, overcoming the handicaps of previous mechanical solutions of the problem. The various selective plug connections made to illustrate the selectivity of the present arrangement will be described as the necessity for a description ensues.

Circuit diagram

The operation of the machine may be best understood in connection with the circuit diagram. The machine includes two relay accumulators of the same type and which may be connected for entries in various ways, for either separate or simultaneous entries. When simultaneous entries are made one relay accumulator represents the subtotal of entries, and the other relay accumulator represents a grand total of the entries.

In view of the fact that both accumulators are of the same type, the construction of and entries in only one will be described, although it will be explained how entries are made in the other accumulator by the plugboard.

There are ten keys for entering digits 0-9 in decimal code but the entries are made in the accumulators according to the quinary combinational code, i. e., a five-place code. The code is as follows:

| Digit Entry | Register Setup | Digit Entry | Register Setup |
|---|---|---|---|
| 1 | 1 | 6 | 5+1 |
| 2 | 2 | 7 | 5+2 |
| 3 | 3 | 8 | 5+3 |
| 4 | 4 | 9 | 5+4 |
| 5 | 5 | 0 | None |

Hence, certain key contacts 28 are designated according to the setup it will effect. When the "3" key is depressed the related contacts effect a single 3-digit setup. A 7 key closes the two sets of contacts to effect a combinational 5+2 setup.

The above pertains to effecting addition only, at which time the subtraction R14 relay contacts 1-6 are normal.

Current is supplied to all the electrical instrumentalities by a positive line side 50 and a negative line side 51. When a key is depressed, the circuit extends from positive line 50, through escapement contacts 21, now closed, the respective key contact 28, the related R14 1-6 contacts now normal, to the related one or more of five impulse lines 53 designated 1, 2, 3, 4, 5. To simplify the disclosure, four accumulator orders, units, tens and hundreds and the highest order, which is a balance detecting order, are shown.

To enter 375, as an example, after depressing the 0 key for left-hand orders, the keys 3, 7 and 5 are successively depressed and as they are depressed column selecting relays CSM, CSHTH, CSTTH, CSTH, CSH, CST, CSU are energized in that order under control of the typewriter carriage, by circuits to be described. When each CS column selecting relay is energized, it transfers its 1, 2, 3, 4, 5 contacts.

For each order there is provided five setup relays RS, 1, 2, 3, 4 and 5, which have individual wire connections to the corresponding digit impulse wires 53 through the CS1—5 contacts but only those RS relays of a particular order will be energized because of the energization of the related CS column selecting relay. In the example, the entry of the digit 3 will effect the energization of the RS3 setup relay in the hundreds order (see Fig. 5b). All of the groups of RS relays of the three orders have a return wire connection 54 to negative line side 51 to complete the circuit. It will be noted that the duration of energization of the RS setup control relays is not dependent upon the length of time that the typewriter key is depressed but that the circuit of the energized setup control relay is broken by the opening of the contacts 28 by the cam unit associated with the key. This period of energization is shown in the timing chart of Fig. 4. The energization of the RS setup relays is maintained long enough to effect a pickup of corresponding combining relays RC, 1, 2, 3, 4, 5 of the same order by circuits now to be described.

Figure 5B:
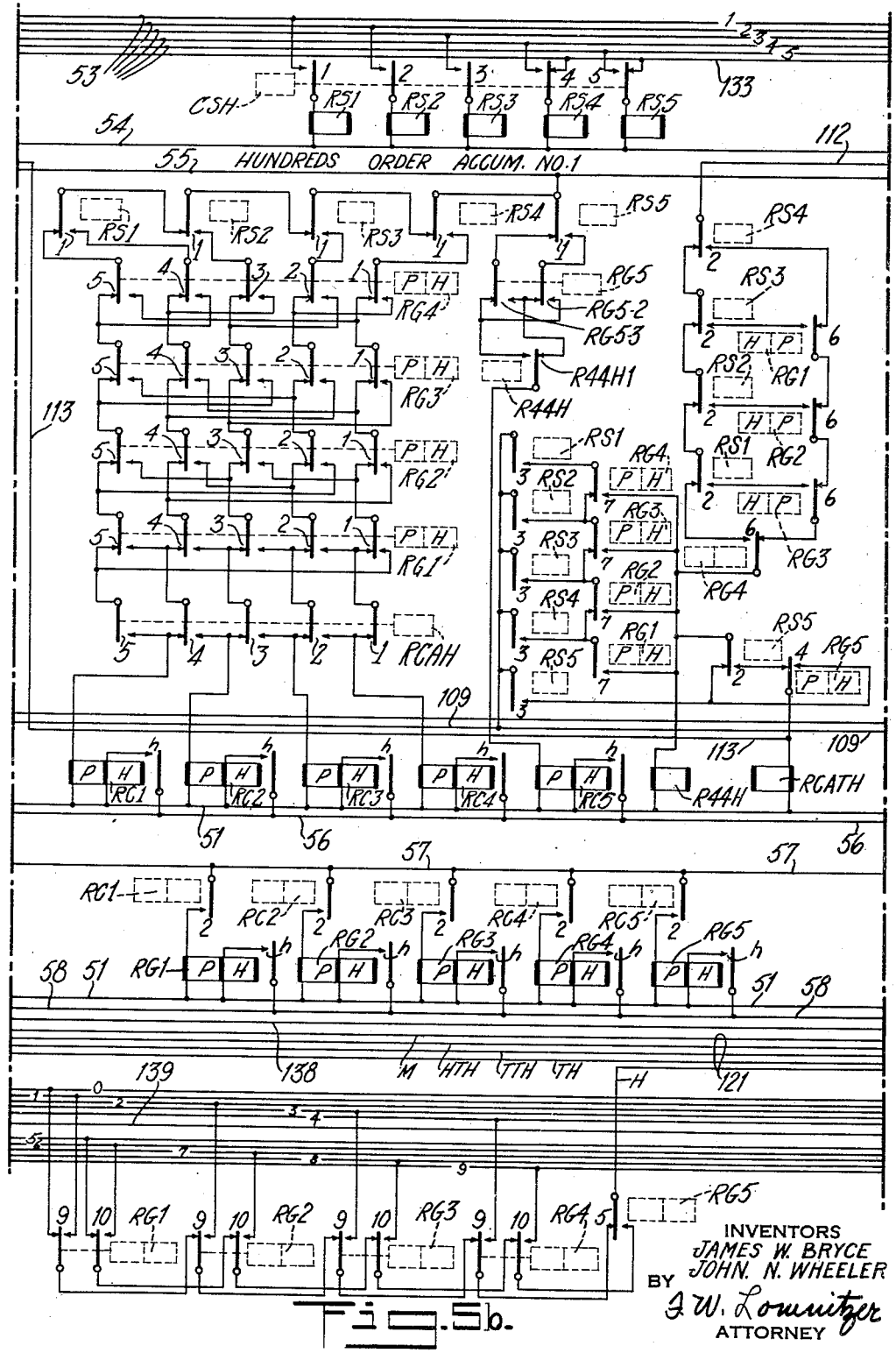

Each of the RS setup relays in the selected order transfers its 1 contacts to close a circuit path to energize an associated combining relay RC, 1, 2, 3, 4 and 5 (see Fig. 5b). The numeral designations 1, 2, 3, 4, 5 along the relays RC, RG, RS indicate the digit value according to the quinary code. The transfer blade of each of said contacts has a wire connection 55 to the positive line side 50 through sequence contacts to be described. Intermediate the points of the "1" transfer contacts of the RS setup relays and the RC combining relays are contacts 1, 2, 3, 4, 5 of register relays RG1, RG2, RG3, RG4, RG5. These contacts are interconnected according to the table of addition but in making an initial entry (after an order has been cleared out), such contacts are at normal position. In the assumed example, transfer of RS3—1 contacts in the hundreds order (Fig. 5b) will close a circuit path to RC3 pickup coil of the combining relay when the pickup circuit wire 55 is closed. In the same way for an initial entry any RC combining relay is picked up by the corresponding RS relay. The RC relays are dual-wound relays and the pickup coils and hold coils are each connected to the negative line side 51. Each pickup coil closes its hold contacts "h," closing a circuit from line 51, through the hold coil, the "h" contacts, wire 56 to the positive line side through sequence contacts to be later described.

There are five register relays RG designated 1, 2, 3, 4, 5 which are selectively energized under control of the 1, 2, 3, 4 and 5 contacts of the associated RC combining relay. The energizing circuit is from the pickup energizing circuit wire 57, closed in a manner to be described, one of the transfer contacts of RC now transferred, the pickup coil of the corresponding RG relay to negative line 51. The hold circuit for the hold coil, since the RG relays are also dual-wound relays, is from negative line side 51, through the H relay coil, the "h" hold contacts, and by wire 58 through sequence contacts to be described, to positive line 50.

Successive entries in the accumulator may be best understood by taking an example in which an initial entry of 375 is first entered and then 025 which sums up to 400. By means of a column selecting arrangement controlled by column readout of the typewriter, the entry directing circuits under control of the keyboard are conditioned when the typewriter carriage is at a certain typing position. The column position for the first digit entry may be obtained by successive key depressions of the space bar or by means of the regular tabulating mechanism.

At this first column position, by a circuit to be subsequently explained, the column shift relay CSM is first energized. By successive 0 key depressions finally the CSH relay is energized just before the 3 key is depressed. CHS relay transfers its "3" contacts (Fig. 5b), causing the energization of the RS3 setup relay in the hundreds order when the 3 key is depressed. The RS3 relay will close its "1" relay contacts and a circuit will now be completed through the addition network and contacts controlled by the RG1—5 relays of the hundreds order and, since a carry will not be effected, the RCAH relay and its 1-5 relay contacts will be in normal position and accordingly the RC3 combining relay will be energized and held energized.

The later will close its "2" contacts, thus picking up the RG3 relay which will be held energized by its stick circuit. As a result of the depression of the 3 key, the typewriter carriage through its column readout will now be spaced to cause the energization of the CST or tens column selecting relay. The 7 typewriter key is now depressed and according to the quinary code it will cause the energization of the RG5 and RG2 relays in the tens order (see Fig. 5c). This entry with the concomitant typing of the 7 digit will cause the typewriter carriage to be shifted so that the units or CSU column selecting relay will be energized, and in the same manner the depression of the 5 typewriter key will cause the energization of the RG5 register relay in the units order (see Fig. 5d).

The machine is now conditioned for effecting the addition of the number 25 which can be performed at another column position of the typewriter carriage or in the same corresponding column positions of the typewriter if the typewriter carriage has been retracted. If so desired, through plug connections to be subsequently described, the typewriter keyboard may effect the desired digit entries at the same time the digits are typed on another portion of the sheet in the typewriter.

*Column selection for successive entries*

General reference has been made to the CS column selecting relays of which there is one for each accumulator order. These relays are energized in succession to direct the digital impulses transmitted by the keys to the accumulator orders in succession. Their successive energization is under control of a column readout, the movable element of which is carried by the platen carriage.

As best shown in Fig. 5e and Fig. 1, said carriage carries a movable contact element 60 engaging a stationary common conductor strip 61 and in succession column contacts 62 carried by an insulating plate, the contacts 62 having connected thereto plug sockets 63 from which plug connections are made to direct entries in a selected accumulator at desired column spaces of the work sheet. All the CS column selecting relays for each accumulator are commonly wired to the negative line side 51, but their other sides have individual wire connections to plug sockets 65. The eight plug sockets 63 at the position accumulator entries are to be made, has respective plug connections 66 to corresponding ones of a series of plug sockets 67. The latter have wire connections to transfer blades of a total control relay R17. The left-hand contacts are connected to plug sockets 68. The latter have individual plug connections 69 to the sockets 65 related to the CS column selecting relays. In effecting entries the R17 relay is deenergized, so that normally related plug sockets 67 and 68 are interconnected, as shown. The energizing circuit for energizing a CS relay (Fig. 5e) is from the positive line side 50, through escapement contacts 21, the common conducting strip 61, movable contact element 60, column contacts 62, plug socket 63, plug connection 66 to plug socket 67, through the respective "5-11" contacts of the R17 relay, plug socket 68, plug wire connection 69, plug socket 65, a wire 64, to the CS relay to the negative line side 51. This will cause the energization of the CS relay and, when the platen carriage escapes to the next column position, through a similar circuit the next lower order relay will be energized and in the same way the successive column position of the platen carriage will cause the lower order CS relays to be energized in succession.

*Escapement contacts*

The escapement contacts 21 (Fig. 5e) are provided for the purpose of breaking the circuit at such contacts rather than at the column readout. These contacts are under control of the well known typewriter escapement mechanism, which is fully shown and described in the patent to C. W. Crumrine, No. 1,945,847 and comprises, as shown in Fig. 3, a pair of pawls 77 cooperating with a rack 78 on the platen carriage. The pawls have elongated slots in which fit a pivot rod 80, and a spring (not shown) tends to move the teeth over the rack or swing them into engagement. The operating arm 43 moves the pawl which engages the rack to release the carriage for movement by the spring drum until the rack engages the pawl to stop movement of the rack to end the letter space movement. Mounted on a pivot rod is a bell crank 82, one arm having a lug 83 in engagement with a notch 84 of both pawls. When a pawl 77 is rocked counterclockwise to release the rack 78 and move it to the left by said spring, the resiliency of spring blade 21A will rock bell crank 82 counterclockwise and contacts 21 thus open during the letter space movement of the carriage. When the pawl engages the rack, the pawl will again be shifted to the right by the movement of the rack, and by reversely rocking the bell crank 82 contacts 21 will be closed at the end of the letter space movement.

There are other circuits in series with the escapement contacts 21 so that the latter opens these particular circuits for the same purpose.

*Sequence contacts*

A general description has been given of the manner in which the entry 375 was made without a particular consideration to the manner in which the energizing and holding circuits involved were sequentially opened and closed. For the proper registration of entries in each order, the energizing and holding circuits pertaining to the combining and register relays must be closed and opened at predetermined times. The means to effect such sequential control is preferably instituted by a reciprocating part of the typewriter, operable in synchronism with the key depressions, and the sequence contacts involved in the previous description of entries in the accumulator will now be described.

In Fig. 1, reference numeral 91 represents a control plate and 90 a ribbon lift bail which correspond to the same elements designated 72 and 71, respectively, of Fig. 1 in the patent to R. G. Thompson, No. 2,000,202, and by connections from the ribbon lift bail and control plate the sequence contacts are operated. Attached to a rock shaft 94 is an arm 95 to which a spring 92 is attached to thus rock the shaft, so that a bracket 93 attached to said rock shaft will bear against the control plate 91. A push rod 96 is connected to said arm 95 and is guided for reciprocation, the free end of said push rod actuating a group of contacts. When the ribbon lift bail 90 is caused to be rocked in a counterclockwise direction by the action of any key, the rock shaft 94 is caused to rock in a clockwise direction and through arm 95 and push rod 96 a group of contacts are operated in a definite sequence.

Referring to the circuit diagram and Fig. 1, said contact group is built up in such a way so as to comprise three normally open contacts 22, 23 and 24 and two normally closed contacts 25 and 26. In the movement of the push rod 96 in one direction, these contacts are operated in the following sequence and as shown in the timing diagram of Fig. 4. First, the contact 24 is closed, then contact 23 is closed, then contact 26 is opened, which is followed by the closure of contact 22 and finally contact 25 is open. This occurs during the left-hand (Fig. 1) movement of the push rod, or upwardly in the circuit diagram. During the return movement of the push rod 96, the sequence of operation of the contacts is reversed. First, contact 25 closes, 22 opens, 26 closes, 23 opens and finally 24 opens. This completes a full cycle of operation of the contact group.

However, some of the circuits are not directly controlled by these contacts but by relay contacts of relays which are energized under control of the mechanically operated contacts. For example, it will be seen later that the hold circuit for RC relays is not actually controlled by contacts 23 but by associated relay contacts RSE7A, and the pickup circuit for RC relays is closed by RSE6A relay contacts instead of contacts 22, and the holding circuit for the RG relays is controlled by RSE8A relay contacts instead of associated contacts 25. It will be noted that the mechanically operated contacts and associated relay contacts have different timing which is secured in the present machine by obtaining the desired length of time for the energization of these relays from independently controlled sources. This will be better understood in connection with the description of each energizing and holding circuit as they are encountered in the description of the operation of the machine.

Fig. 4 also shows the timing of the contacts closed as a result of the depression of the keys. The length of time these contacts are closed and the RS relays is controlled by the cam units and is not dependent upon the key depression by the fingers of the operator, and thus the timing is substantially the same for all key-controlled contacts and RS relays.

After an RS setup relay is picked up and held energized, first contacts 24 and 24A close, but they do not have any function at this time because they close the carry determining circuits. Immediately thereafter, contacts 23 close to pick up the RSE7 sequence relay (Fig. 5k) by a circuit from the positive line side 50 through contacts 24, 23 now closed, RSE7 relay to negative line side 51. At the same time a condenser 100 in series with a resistor 101 and both in shunt with the RSE7 relay coil is charged. RSE7 relay closes the RSE7A contacts which prepare the holding circuit 56 for the RC combining relays, when they are picked up. It should be noted that the RSE7A contacts are held longer than the mechanically operated contacts 23 which caused through relay RSE7 their closure, the reason therefor being explained later.

The mechanically operated contacts 26 then open, to open the pickup circuit 57 for the RG register relays, to be described later. The pickup circuit is from line side 50, through contacts 25 still closed, contacts 26 now open and wire 57.

Next, contacts 22 close to cause the RSE6 relay (Fig. 5k) to be picked up by the following circuit: from line 50, contacts 22, through condenser 102, and resistor 103 which are in parallel, RSE6 relay to line 51. The RSE6 sequence relay is energized by the charging current of the condenser and, when the condenser becomes completely charged, the current drops to zero and relay RSE6 deenergizes. The resistor 103 is a very high ohm resistor and the resulting current through it and the relay coil is insufficient to maintain the relay energized. By suitable values of the resistor and condenser, the period of energization of the RSE6 relay and closure of RSE6A contacts can be controlled.

The closure of RSE6A contacts complete the pickup circuit for the RC combining relays, which as stated are energized under control of the contacts of the RS setup relays. This pickup circuit is from line 50, RSE6A contacts, R15B contacts closed in a manner now to be explained, and wire 55, the rest of the energizing and adding circuit for RC relays having been previously explained.

Having picked up an RC combining relay, its hold coil is held through the RSE7A relay contacts, the RSE7A relay contacts being closed considerably longer than the RSE6A contacts, as appears in Fig. 3. The hold circuit is through RSE7A contacts, and wire 56, previously mentioned.

The R15 relay is picked up under control of the "7" relay contacts of the CSU, CST, etc. relays as they are energized in succession. The energizing circuit is from the line 50, escapement contacts 21, readout strip 61, wire 105 (Fig. 5e), one of the "7" contacts of CS relays now closed, wire 106 (Figs. 5e, 5j), R10B relay contacts now closed, R11B relay contacts now closed, the R15 pickup relay coil to line 51. A stick circuit for R15 is held through R11B, R10B relay contacts, R15C hold contacts, R3A relay contacts now closed, back to line 50. R15 relay has other controlling contacts (R15A) having a function to be later explained.

Next, contacts 25 open, but for initial entry they have no function to perform at this time.

Aside of the contacts 25 there is a supplemental pair of contacts 24A, 25A and 26A also operated by the push rod 96 to have the same time of closure and opening as contacts 24, 25 and 26. There is normally a circuit from line 50, through contacts 25A (Fig. 5k), R9 relay coil to line side 51, thus retaining R9 energized and R9B relay contacts open until contacts 25A open, at which time R9B relay contacts close to shunt a resistor 107 across a condenser 108. The RSE8 relay is normally energized by a circuit from line 50, R25 contacts, condenser 108, RSE8 relay coil to line 51. The dropping of the current to zero deenergizes the RSE8 relay coil, and its contacts RSE8A open much later than when contacts 25A open (see Fig. 4). The function of the RSE8A relay contacts appears later in the description, since it pertains to the opening of the hold circuit for the RG register relays.

So far, the combining relays have been energized and held energized, and with return of the push rod the selected RG register relays are energized and held energized.

In the return of the push rod, contacts 25A and 25 first close. Closure of contacts 25A completes an obvious circuit to R9 relay, which opens R9B contacts. Closure of contacts 25 completes a circuit through the condenser 108 (R9B now open) to RSE8 relay coil. Closure of R25 causes RSE8 to energize immediately and open the RSE8A contact. RSE8 is maintained energized until the condenser 108 has become charged to a point where the existing charging current is insufficient to maintain the relay picked up, at which time the RSE8A contact again closes.

Contacts 22 thereafter open which has no further function than opening the circuit to RSE6 and thus allowing the charge in the condenser 102 to leak off across the resistor 103.

Following opening of contacts 22, contacts 26 close which directly complete a pickup circuit to the selected register relays RG. The pickup circuit is from line 50, contacts 25, 26, wire 57, the remainder of the energizing circuit to pick up selected register relays having been described.

Reference has been made to the closure of the RSE8A relay contacts (Fig. 5k), and these provide a hold circuit for the hold coils of the selected RG register relays by a hold circuit from the "h" contacts, wire 58, R2A relay now closed, RSE8A relay contacts to line 50.

Following the closure of contact 26, contacts 23, 24 open in this succession. Contact 23 opens the energizing circuit of the RSE7 relay (Fig. 5k) and permits the charged condenser 100 to discharge through the resistor 101 across relay coil RSE7, and its contacts RSE7A hold a greater length of time, and when they finally open they open the hold circuit for the energized RC combining relays.

Finally, contacts 24 open and, since these have a function appearing later, the controlling circuits will not be described.

In the assumed example of the entry of 375, the following RG register relays are energized and held energized in the different orders.

| Hundreds | Tens | Units |
| --- | --- | --- |
| RG3 | RG5, RG2 | RG5 |

It is to be noted that, since the holding circuit 58 for the RG relays is common to all orders and commonly controlled by the RSE8A contacts, the opening of such contacts deenergizes all RG relays in higher orders, but they are reenergized automatically for the following reasons.

When RSE7A contacts open, the holding circuit 56 for all RC combining relays previously set up in a higher order or orders are deenergized. Their "2" contacts go back to normal but the corresponding RG relays set up remain energized until RSE8A contacts open in the next key operation, as will be described. The energized RG1—5 relays, therefore, keep their respective contacts 1—5 in the adding circuit transferred. Thus, the energizing impulse directed by contacts RSE6A and wire 55 through the "1" transfer contacts of the RSU setup relays in all previously setup orders (now normal because RSU setup relays in these orders are deenergized) through the normal and transferred 1–5 contacts in the adding circuit of all RG relays to again pick up the corresponding RC combining relays. Thus, the latter are reenergized to pick up the RG relays and thus the digit entry is re-entered for each of such higher orders.

To pick up RC5 so as to again set up RG5 in each order setup, the circuit is from wire 55, RS5—1 contacts now normal, RG5—3 contacts now transferred, the "1" contacts of R44, U, T, H, etc. relays now normal to the RC5 relay pickup coil. The latter again picks up RG5 in the same order.

*Successive entries to effect addition*

In order to understand how successive entries effect addition in the accumulators, it will be explained by way of example how the next entry of –025– is additively made.

By obviously arranged plug connections on the plug-board and connections from the column readout, this next entry can be made on the same line of the printed sheet with the typing also being performed concomitantly with the digit entries. The portion of the sheet to receive the next entry can be reached by tabulating the platen carriage, or operating the space bar. When successive entries are made on the same printed line, the mode of operation is known as "cross-footing."

If the next entry should be typed on the next line, then the platen is line-spaced and reversely positioned to type the digit entries in spaces aligned with the previous typed digit entry of –375– in corresponding denominational orders.

Figure 5F:
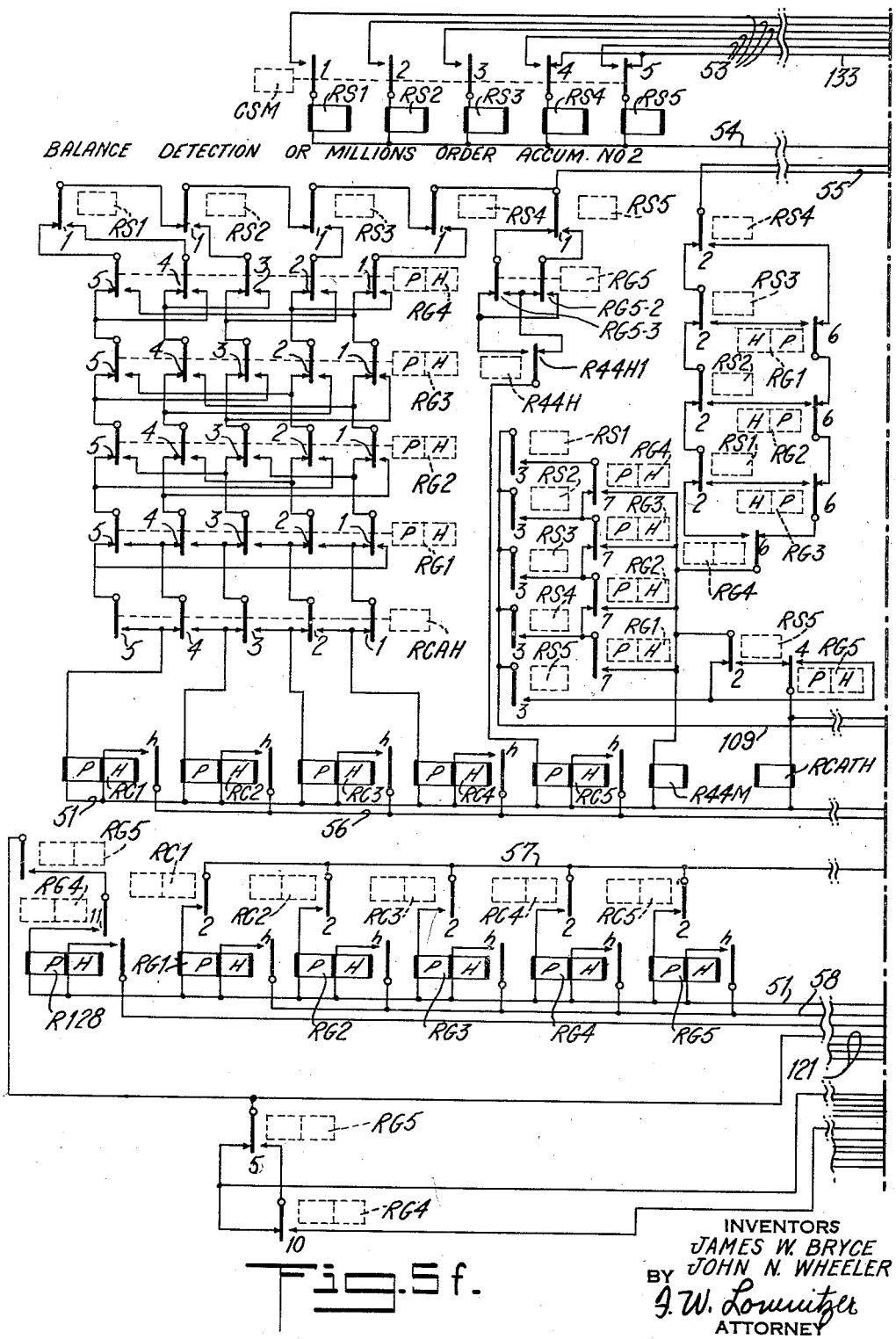
Figure 5H:
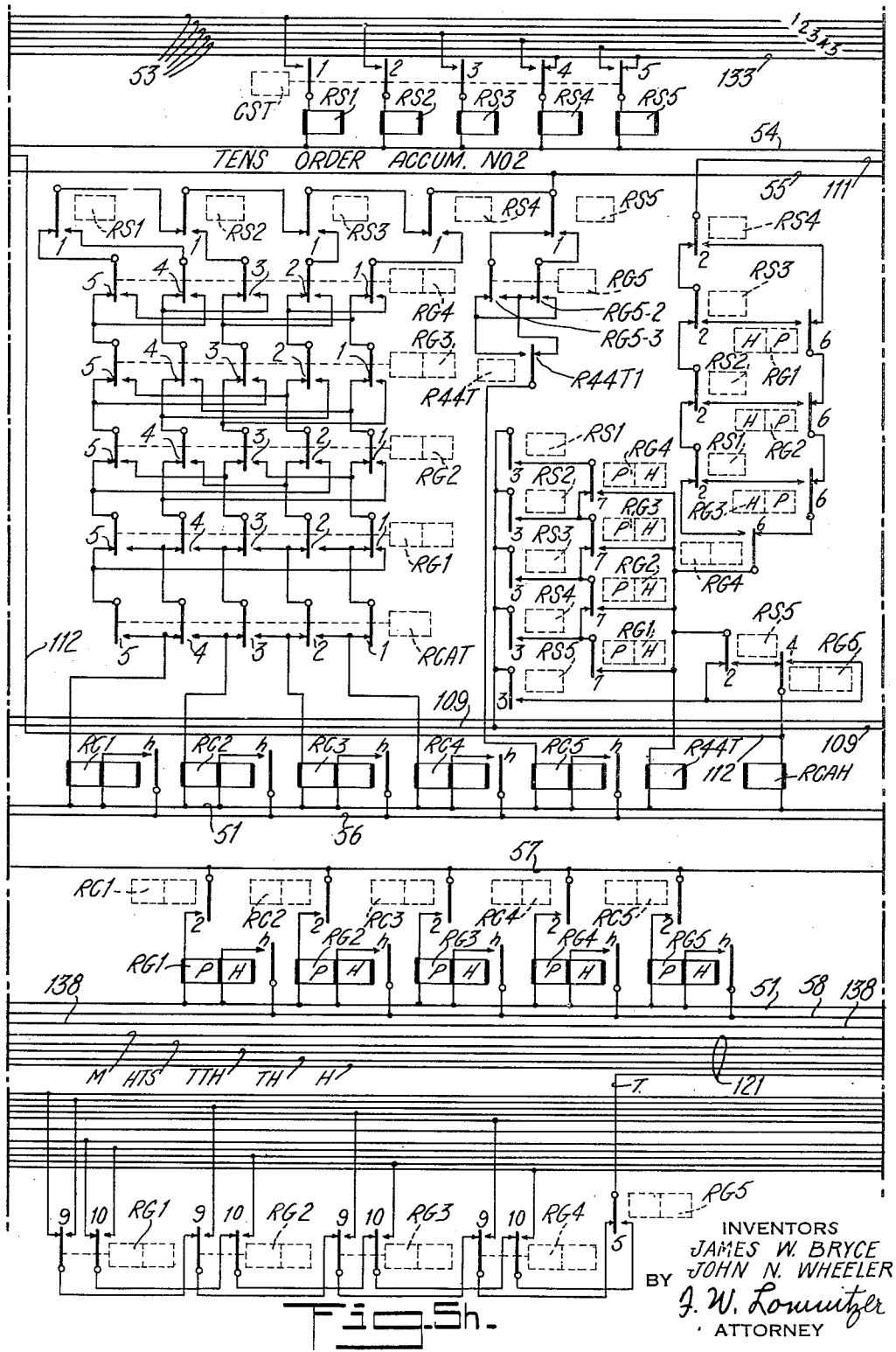
Figure 5I:
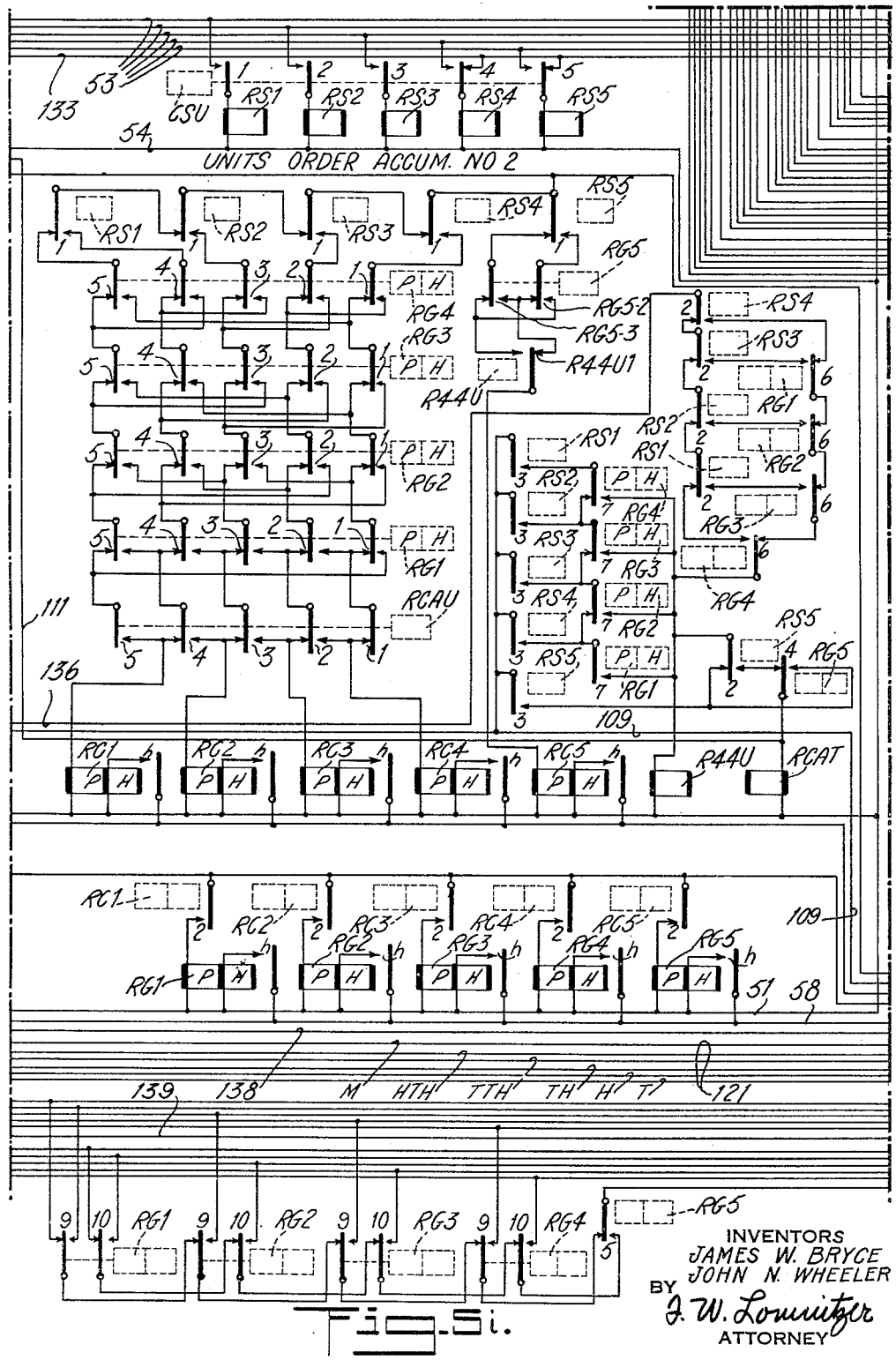

In either type of entry, the digit entries can also be made in accumulator No. 2, shown in Figs. 5f, g, h, i, so as to provide a grand total of the entries. Of course, suitable plug connections are made to effect this operation.

The first key operation is to enter 2 in the tens order. In this order (Fig. 5c), the RG5 and RG2 relays are already energized. Thus, the 2 entry should result in the energization of the RG4 relay, and the retained energization of the RG5 relay, according to the quinary code to represent the 9, or the digit summation of 7 and 2. When the 2 key is depressed, the RS2 relay in the tens order will immediately be energized and transfer its "1" contacts, and with the RG2, 1–5 contacts in the adding circuit now transferred, the energizing impulse directed by wire 55 will pass through normally closed "1" contacts of RS4 and RS3, the transferred "2" contacts of RS2, the RG4—3 contacts now normal, RG3—3 now normal, the transferred contact RG2—3, the RG1—1 contacts now normal, the RCAT—1 contacts now normal, to the pickup coil of the RC4 combining relay. The latter energizes and picks up RG4, which is the result desired.

The RC5 relay is again picked up by a circuit by wire 55, RS5—1 contacts now normal, RG5—3 contacts now transferred, R44T—1 contacts now normal, to RC5 relay. Thus, when RSE8A contacts open to tend to deenergize RG5, the RC5 relay will keep RG5 energized. The accumulator now represents –395–. The next key depression is to enter 5 in the units order. In this order only RG5 is energized, so that the entry of 5 must represent 0 in the units order, effect a carry to the tens order, represent 0 in this tens order, and a carry to the hundreds order to represent 4.

Remembering that RG5 is held energized in the units order, it will be seen that the impulse directed to wire 55 passes through the RS5—1 contacts in the units order now transferred because of the "5" key depression, RG5—2 contacts now transferred, to an open circuit at R44U1 contacts. RG5 in the units order deenergizes when RSE8A relay contacts open. This order now represents 0. However, a carry should be effected to the tens order, and is performed in the following manner. A units carry to the next or tens order is performed by energizing RCAT relay by a circuit from the positive line side 58, contacts 24 closed shortly after a key depression (see Fig. 4), R15A relay contacts now closed, wire 109, the RS5—3 relay contacts in the units order now shifted because of the 5 key depression, RG5—4 contacts now shifted (due to the previous 5 registration), RCAT relay to line 51.

A circuit also extends by units carry wire 111, through the following normal contacts in the tens order: RS4—2, RS3—2, RS2—2, RS1—2, and transferred contacts RG4—6 relay contacts (the tens order now represents 5, 4), relay contacts RS5—2 now normal, RG5—4 relay contacts now transferred, relay coil RCAH to line 51. Also from the RG4—6 contact blade an impulse is directed to R44T relay coil to line 51. So far, it will be seen that 5+5 in the units order represents 0 and causes RCAT, RCAH, and R44T to be energized. RCAT transfers its 1–5 contacts in the tens adding circuit but has an effect to be noted later. R44T is energized to transfer R44T1 contacts. When a later impulse is directed by wire 55 through the closure of RSE8A relay contacts, a circuit is completed by wire 55, RS5—1 contacts in the tens order now normal, RG5—3 contacts now transferred, R44T1 contacts in the tens order now transferred, and thus an open circuit which prevents RC5 in the tens order from being picked up to energize RG5. The latter relay deenergizes when RSE8A contacts open.

RG4 is also energized in this tens order but is deenergized when RSE8A contacts open. While the RG4—1 contacts in the tens order adding circuit are transferred, in the adding circuit the circuit which would pick up the RC4 combining relay is open at the RCAT1 contacts which are now transferred. Hence, RG4 in the tens order deenergizes and the tens order also represents 0.

In the hundreds order the RG3 relay is energized and its 1–5 contacts in the adding circuit are transferred. Also in the adding circuit the RCAH1—5 contacts are transferred. An impulse will now be directed when RSE6 contacts close by wire 55, serially through the normal "1" contacts of RS4, 3, 2, 1 relays, through RG4—5 contacts now normal, RG3—5 contacts now shifted, RG2—2 contacts now normal, RG1—2 contacts now normal, RCAH2 contacts now shifted, to the RC4 combining relay which holds and picks up the RG4 register relay in the hundreds order.

The accumulator now represents 400.

While the preceding example shows how addition is performed, how a units carry is effected, how carries by carries are performed, to more fully understand some circuits not involved in the preceding example, the following two sections are devoted to a general explanation of carry circuits and other registering circuits.

*Special "5" registration*

Under certain conditions it is necessary to register 5 when the sum of the previous registration and the next entry equal 5. This arrangement is provided for each order that receives an entry.

The carry impulse line 109 may, for any order, direct an impulse through the "3" contacts of the setup relays RS1—4 of any order and associated "7" contacts of the register relays RG1—4. These "3" and "7" contacts are connected according to addition with the base 5, so that whenever a previously registered digit and a new digit entry add to 5, the impulse is directed through the closed contacts to an R44 "5" determining relay to line 51. The latter closes its R44—1 contacts in the same order, so that a later timed impulse from wire 55 is directed through the RS5—1 contacts, RG5—3 contacts, both normal, through the R44H1 contacts now transferred, to the RC5 combining relay. The latter picks up the RG5 register relay.

In other problems a "5" digit should be registered in each higher order when a carry is received from the lower accumulator order for that order, and when a digit entry in that order equals 4 a previous registered digit in that order equals 4 or the sum of the previous digit entry in that order and the new digit entry equals 4.

A carry pulse is directed by wire 111, 112, 113, etc. to an adding circuit network for each higher order which comprises the "2" transfer contacts of the RS1—4 relays of that order, and the "6" transfer contacts of the RG1—4 relays. These relay contacts are so interconnected that a "5" determining relay R44 is energized by obvious circuits when:

1. The RS4 relay representing a new 4-digit entry alone has been transferred;

2. The RG4 relay representing a previous 4-digit entry alone has been transferred;

3. Combinations of RG and RS relays summing to 4 are energized. For example, transfer of the "2" contacts of RS3 and transfer of the "6" contacts of RG1 in the tens order close the units carry pulse circuit 111 to the R44T "5"

determining relay. In the same way transfer of "2" contacts RS2 and "6" contacts of RG2 complete the circuit, as will also the contacts of RS1 and RG3.

Units carry circuits

By the following described circuits the units carries are made according to certain conditions.

1. A 5 registration combined with a 5 entry. For a 5 registration the "4" contacts of RG5 in the lower order are transferred; also the "3" contacts of RS5 in the same order are transferred. A circuit is then completed from units carry pulse wire 109 through such contacts to the RCA relay in that order to energize the latter. The latter transfers its 1-5 contacts in the adding circuit of the next higher order. The impulse to RCA may also be directed by a wire 111, 112 to effect a carry by a carry, if required.

2. A summation of 5 caused by the previous digit entry of 4, 3, 2, 1 plus the new entry of 1, 2, 3, 4, respectively, with a new "5" digit entry when entering in the quinary code the digits 6, 7, 8 and 9. In this case, as previously described, the "3" contacts of either RS1, 2, 3, or 4, and "7" contacts of either RG1, 2, 3 or 4 close a circuit to the "2" transfer contacts of RS5. For a "5" digit entry these "2" contacts are transferred to close a circuit to RCA in that order and wire 111.

3. The same as in 2 above except that "5" was previously registered. In this case the "4" contacts or RG5 are transferred, and "2" contacts of RS5 are normal, to close a circuit to RCA and impulse wire 111.

Whenever an RCA carry relay is energized by the requirement of a transfer, its series of "1-5" contacts in the adding circuit of the next higher order are transferred.

These contacts are connected between the 1-5 contacts controlled by the RG relays and the RC relay pickup coils so that the RC relay of the next higher digit is energized upon an entry. For example, if RC1 was to be energized, the impulse circuit thereto would be interrupted and would be transferred by a "5" contact of RCA to energize RC2 instead. The same applies to selection of other RC relays of the next higher digit.

Reference has been made to the carry pulse wire 111 or 112 which is connected to a circuit network to effect, under some conditions, a 5 registration. Wire 111 or 112 leads to a network consisting of the "2" contacts of the RS4, 3, 2 and 1 relays and the "6" contacts of the RG1, 2, 3, 4 relays which, as previously described, are so arranged that either a digit entry of 4, a digit registration of 4, or a combined previous and new digit entry of 4 extends the circuit to R44 relay. Thus, the "4" determination and a units carry must register 5 in the next higher order.

An impulse from wire 55 will now be directed through normal "1" contacts of RS5 (assuming no 5 entry) now normal, the "3" contacts of RG5 now normal, the "1" contacts of R44 now transferred, to RC5 which picks up RG5 to register a 5 digit in the next higher order.

Assuming now that a 5 digit has already been entered, this order will now represent 0. The circuit extends from wire 55, through the "1" contacts of RS5 now normal, the "3" contacts of RG5 now transferred, but are open at the "1" contacts of R44 to prevent the energization of RC5 and RG5 in this order.

In another case there may be an entry of 9 or 5+4, a 5 registered in that order, and a units carry from a lower order. R44, RS5 and RG5 are now energized. The circuit extends from wire 55, "1" contacts of RS5 now transferred, the "2" contacts of RG5 now transferred, the "1" contacts of R44 now transferred, to energize RC5, to effect a "5" digit entry by energizing RG5.

Termination of digit entry

After entering the units digit, the platen carriage spaces to the next letter space, and by a plug connection 67 from the related column readout position to a plug socket 67 marked "*," a circuit to R3 is closed through R17—4 relay contacts which are now normal. The R3 relay opens its R3A contacts in the hold circuit of R15 and the latter deenergizes.

Total printing

The machine also has provisions for reading out the digit representations of the selected accumulators and typing such digits of the total by the digit type of the typewriter. The total printing operations are preferably initiated by manual means, but once initiated continue automatically until the complete total has been typed. The successive selection of the orders of the accumulator is controlled by the column readout of the typewriter carriage, so that by such interlock means a successive digit cannot be typed until the previous digit has been typed. By this interlock means the next order of the accumulator to be read out cannot select a digit type bar for a typing operation until the type bar being operated has returned and the carriage has been spaced to the next letter space. The orders of the accumulator are read out in succession, preferably starting at the highest denominational order.

By means of the column readout control and associated plugboard, suitable plug connections can determine where total printing shall occur on the sheet, either from accumulator No. 1 or No. 2. The desired column printing can be reached by either operating the space bar or the tabulating mechanism. In cross-footing the total printed may be on the same line as the associated items, or alternatively, total printing may occur on the bottom line of a series of items in the manner printed by a conventional adding-listing machine.

Since the digit representations are in the quinary code, it is necessary to re-convert this coded representation to the decimal code. To this end the five register relays RG in each order except the highest operate a series of translator relay contacts (see bottom of Figs. 5a, 5b, 5c, 5d). These contacts are interconnected to form a translating system to convert the quinary code to a decimal code. According to the combinations of contacts operated, one of a series of 0-9 digit lines 120 is selected. If no contacts are operated in a translating network for an order, the 0 digit line 120 is selected. Reference numeral 121 represents the columnar denominational order selecting lines and these terminate at plug sockets 122 (Fig. 5j). It will also be seen from Fig. 5e that the 0-9 digit lines 120 are continued through relay contacts R128—3—12, so that normally the 0-9 digit lines 120 are connected through digit lines 123 to the related 0-9 digit typing solenoids 48. As these solenoids are energized, the associated cam units cause the actuation of the related type bars to print the digits of the total, as will be explained.

For selecting the columns or spaces on the work sheet to receive the total, plug connections 124 (Fig. 5e) are made from the plug sockets 63 of the column readout at the column positions a total is to be printed to the plug sockets 67. Plug connections 125 are also made from plug sockets 126 to the aforementioned plug sockets 122. The plug sockets 67 and 126 are normally disconnected from each other by the 5—11 relay contacts of the unenergized total printing control relay R17, since the blades of such contacts are in normal position during digit entries. R17 relay is energized when a total is printed to extend circuits from plugs 67 to corresponding plugs 126. Thus, as a result of the energization of relay R17 the column selecting wires 120 of the different orders of the translating system have their circuits successively completed under control of said column readout.

To initiate total printing operations, either the T1 or T2 key is depressed according to which accumulator is to control total printing. When T1 key, for example, is depressed, an obvious circuit is completed to the pickup coil of R17 (Fig. 5j). R17 closes its "h" contacts, completing a hold circuit for R17H through said contacts and R12A contacts. R10 relay in shunt with R17H is also held energized by the aforesaid stick circuit. The R10 relay opens its R10B and R10C contacts to prevent energization of the R15 relay for accumulator #1, and R16 relay for accumulator #2. Thus, each of said relays will open its respective R15A or R16A contacts to prevent the possibility of making an entry in either accumulator during a total printing operation. The R10 relay closes its R10A contacts for a purpose to be explained.

The circuits which are completed for printing the total 400 standing in the accumulator No. 1 may best be understood by the following recapitulation.

It will now be explained how the total is printed under control of the accumulator, it being assumed that it now represents a total 0000400. It will also be assumed that seven columns of the column readout are plugged up to print the total digits of seven orders, and two extra for a purpose to be explained. Upon depression of key T1 a circuit is closed from line 50, through escapement contacts 21, contact strip 61 (Fig. 5e), through the column readout brush 60 at the column position for printing from the millions order of the accumulator, column contact 62, through plug socket 63, plug connection 124 to the "M" plug socket 67, relay contacts R17—11 now transferred, plug socket 126, plug connection 125, the plug socket 122"M" (Fig. 5j) which is connected to the column readout wire 121 for the millions order translator, RG5 normally closed "0" wire 120, R128—12 contacts, 0 digit wire 123, R1A relay contacts normally closed, "space" solenoid 48, to line 51. No printing is effected and the column readout selects the hundreds of thousands order. The translator represents 0 in this order. This accumulator order is not shown, but is like the hundreds order. The circuit then continues by wire 121 for the tens of thousands order through the RG5—5, RG4—9, RG3—9, RG2—9, RG1—9 contacts of the translator now normal, the digit wire "0" of the wires 120, then through R128—12 contacts (Fig. 5j), the 0 digit wire 123, the R1A relay contacts, the "space" solenoid 48 to line 51. No printing is effected and in the same manner letter spacing continues for successive orders until the hundreds order is reached.

In the hundreds order of the translator (Fig. 5b) the circuit extends through RG5—5 now normal, RG4—9 contacts now transferred, the 4 digit wire 120, R128—8 relay contacts, the 4 digit wire 123, the 4 digit solenoid 48, pickup coil of R1 relay to line 51. This 4 solenoid then operates the 4 typewriter key to print the total digit 4 on the work sheet and the platen carriage letter spaces. The R1 relay closes the R1B relay contacts and the hold circuit is maintained through R1H relay coil, R1B relay contacts, R2D and R4D relay contacts now closed, back to line 50. The R1 relay transfers the R1A relay contacts, thus connecting the 0 digit key solenoid to the 0 digit line 123. Through a similar circuit connection the 0 solenoid 48 will be picked up because the tens order represents 0 in the assumed example. The platen carriage then letter-spaces to print the total standing in the units order of the accumulator which is also 0, and 0 digit printing will be repeated. After printing the last 0, the platen carriage escapes to the next column position to print an asterisk.

For identifying the printing of the digits as a total, it is desirable to automatically print an asterisk after printing the units digit of the total. A plug connection 124 (Fig. 5e) is accordingly made from the column readout which next follows the units digit total printing position and, when the platen carriage reaches such position, by an obvious circuit which extends through the escapement contacts 21 through the column readout and a plug connection 124 to the hub 67 marked *, a circuit is extended through the R17—4 relay contacts now transferred and a wire 130 to the asterisk printing control solenoid 48. This will cause the actuation of the type bar carrying the asterisk to print this designation. The platen carriage then spaces to the succeeding column position and under control of the column readout and a plug connection 124 therefrom to the plug socket 67 designated "S" (Fig. 5e), a circuit is extended through the R10A relay contacts now closed, the R2 relay, to line 50. The R2 relay closes the R2C relay contacts to complete an obvious circuit to the R12 relay which opens its R12A relay contacts and opens the holding circuit for the R17 and R10 relays.

Opening of the R2D relay contacts opens the holding circuit for the R1 relay and the latter drops out. The R2A relay contacts open the holding circuit 58, for the holding coils of the RG register relays which have been energized in the units, tens and hundreds orders, and the latter drop out so that these accumulators are now clear of any digit representation.

Subtraction

It is also desirable to have provisions for entering amounts subtractively and in the present arrangement items are subtracted by entering the nines complements. The machine is conditioned for entering amounts subtractively in either relay accumulator by closing a switch S which by an obvious circuit energizes the R14 subtraction relay. Switch S is of the toggle lever type and remains in switch closing position to maintain the energization of the R14 relay. This switch is manipulated to subtracting position before the depression of the keys to enter the amount subtractively. The R14 subtraction relay transfers items 2, 3, 4, 5 and 6 contacts to thereby change the relationship between the 1, 2, 3, 4, 5 digit lines 53 and the key contacts 28 of each of the keys. The wiring between the key contacts and the digit lines 53 is so arranged that upon the transfer of the subtraction relay contacts the depression of each of the digit keys will cause the energization of the combining and register relays according to the following table:

| Digit Entry | Complement Entry Register Setup |
|---|---|
| 1 | 5, 3 |
| 2 | 5, 2 |
| 3 | 5, 1 |
| 4 | 5 |
| 5 | 4 |
| 6 | 3 |
| 7 | 2 |
| 8 | 1 |
| 9 | 0 |
| 0 | 5, 4 |

Thus, it will be evident that, if the amount 400 is to be entered subtractively upon the depression of the 4 digit key, the transfer of the R14—2 relay contacts (Fig. 5e) will cause the center key contact 28 of the 4 digit key to pick up the RS5 relay coil in the hundreds denominational order through the 5 digit line 53. The depression of other keys will cause the energization of the register relays according to the above table where it will be seen that the digit values of the register relays, singly or in combination, are the nines complement of the digit to be entered. In the present example the RS5 relay will be energized in the hundreds order and through the circuits previously described the RG5 register relay will be energized.

It is, of course, necessary that for all higher orders a 9 be automatically entered and all lower orders at the right of the denominational order of the entered digit. In the assumed example in entering 400 subtractively, in depressing the 4 key "nines" are entered in the two right hand or units and tens order and also in the higher denominational orders to the left of the hundreds order. To this end, each of the digit keys 0-9 has a supplemental contact 27 (at the extreme right) and closure thereof completes a circuit from the line 50, through the escapement contact 21, one of the key contacts 27, the R14—1 relay contacts now closed, wire 131, and thence through one of the "6" relay contacts of the CS column selecting relays, depending upon the particular one which is energized. The circuit then extends through one of such "6" contacts, wire 132 and in the present example it will be seen that, since no entry is effected in the units order, a circuit will be completed through the CSU5 contacts now normal to the RS5 relay and also through the CSU4 relay contacts to the RS4 setup relay. Each of such relays will through the circuit previously described cause the energization of the RG4 and RG5 relays in the units order. It will be seen that through a similar circuit connection effected by wire 133 (Figs. 5d, 5c), a "9" entry will also be made in a tens order and also to all orders to the left of the hundreds order. Thus, upon depressing the 4 key for subtraction the amount 9999599 is first entered, the next 0 key depression causes 9999999 to be entered, and again the latter amount for the third 0 key depression. After entry of the fugitive units, 9999599 is in the accumulator or the 9's complement of 400.

It is also necessary, of course, to enter a fugitive unit in the units order when the sum of an added number and a number already in the accumulator causes the highest denominational order to pass through 0. The fugitive units carry to the units order under such circumstances is effected by the following described circuit.

In view of the fact that the carry circuits have been previously described, it will be unnecessary to describe the manner in which a carry from a lower order is effected to the highest denominational order, this being effected by transmitting an impulse by the wire 116 to a network of contacts generally designated 135 (Fig. 5a). The purpose of this network has been previously described.

In effecting subtraction by the complemental process, it is customary to retain some of the higher denominational orders for only the 9 entry. Therefore, for example, when two complementary numbers are added, the summation of the two 9's in the next to the highest denominational order will effect a units carry to the highest denominational order. Such order may represent 9 or 5 and 4, and and the entry of the next complement number will also add 9 or another 5 and 4. The summation of the two 5's will in the manner previously described close the circuit to a wire 136 to transmit the units carry impulse by this wire to the units order. The impulse directed by the wire 136 when the highest order goes from 9-0 is directed through the network 137 (Fig. 5d) (similar to that previously described) associated with the units order, and according to the previous registration and the new registration in the units order this units impulse will be taken care of to accordingly modify the entry in the units order.

*Printing negative balances as true digits*

As previously intimated, the highest denominational order is utilized for the detection of positive and negative balances. When the balance is negative, a 9 is represented in such order which, according to the combination code selected, is indicated by the energization of the RG5 and RG4 relay in this order. The column selecting wire 121 of such highest order completes a circuit through the RG5—6 contacts, the RG4—11 contacts to the pickup coil of the R128 relay.

R128 relay closes its "h" or hold contacts so that a hold circuit is completed through such contacts and wire 138, R3B, R5B, R2D and R4D relay contacts back to line 50. R128 relay transfers its contacts R128—3—12, thereby establishing a different relationship between the solenoids 48 and the digit lines 120. The contact blades are shifted so that, instead of a digit line 120 selecting a solenoid corresponding to that digit, it will select a solenoid which is the nines complement. In other words, when the translator represents 0, the 0 digit line 120 will through the transfer contact R128—12 select the 9 digit solenoid. The 1 digit line 120 will not select the 1 digit solenoid but will select the 8 digit solenoid, etc. Thus, by printing the 9's complement of the digits of a negative balance or total, the true digits of a negative balance will be typed upon the work sheet.

*Characterization of negative balance*

It is desirable to characterize a negative balance by printing (—) before the total. Typing of this sign is effected by picking up the (—) type actuating solenoid 48. The energizing circuit is from the negative line side 51, through the (—) solenoid 48, wire 139, through the RG4—10 contacts now transferred, through the RG5—5 contacts now transferred to the column selection wire 121 for this order which is now closed at the column readout. Thus, the (—) sign will be printed ahead of the total amount automatically. Upon the completion of printing a total, the * is then printed, and upon the letter space of the carriage to the next column position, a circuit is completed through R10A contacts now closed, and the R2 relay as described, and opening of the R2D contacts opens the hold circuit for the R128 relay and the latter drops out.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a combined typewriter and relay computer wherein said typewriter has a letter-spaced platen carriage, and a digit keyboard, the combination of digit entry relays, there being a group of digit entry relays for each denominational order, a relay type accumulator having digit receiving and representing register relays of successive denominational orders and a digit summation and units carry circuit network for each order controlled by the associated register and digit entry relays, means under control of said keyboard for energizing a selected group of digit entry relays to represent the digit to be entered, means under control of said platen carriage according to its letter space position to render said groups of digit entry relays effective in succession to enable the effective group of energized digit receiving entry relays to control the associated digit summation circuit network and units carry circuit network, and means for completing circuits in each digit summation circuit network and unit carry circuit network under control of the energized register relays representing a previously entered digit and the energized group of entry relays representing a digit to be entered to effect the energization of register relays representing a digit summation and to complete if required, a units carry circuit to the next highest order.

2. In a combined typewriter and relay computer wherein said typewriter has a letter-spaced platen carriage, a digit keyboard, and a reciprocating part actuated for each key operation, the combination of digit entry relays, a relay type accumulator having digit receiving and representing register relays of successive denominational orders and a digit summation circuit network and units carry circuit network for each order controlled by the register and digit receiving entry relays, means under control of said keyboard for energizing said digit entry relays to represent the digit to be entered, means under control of said platen carriage to cause according to its letter space position the energized digit receiving entry relays to control the digit summation circuit network and units carry circuit network of a selected denominational order, and circuit impulsing means operated by said reciprocating part for sequentially completing circuits in said digit summation circuit network and units carry circuit network under control of the energized register relays representing a previously entered digit and the energized entry relays representing a digit to be entered to effect the energization of register relays representing a digit summation and to complete if required, a units carry circuit to the next highest order.

3. In a combined typewriter and relay computer wherein said typewriter has a letter-spaced platen carriage, a part actuated by the operation of each key, and a digit keyboard, the combination of digit entry relays, a relay type accumulator having digit receiving and representing register relays, and combining relays of successive denominational orders and a digit summation circuit network and units carry circuit network for each order controlled by the register and digit entry relays, said combining relays being held during an entry operation by a holding circuit, and said register relays being held energized to retain a digit representation by an associated holding circuit, circuit means controlled by the energized combining relays to energize the corresponding register relays, means under control of said keyboard for energizing said digit entry relays to represent the digit to be entered, means under control of said platen carriage to cause according to its letter space position the energized digit entry relays to control the digit summation and units carry circuit network of a selected denominational order, circuit closing means actuated by said typewriter part for completing circuits in said digit summation circuit network and unit carry circuit network under control of the energized register relays representing a previously entered digit and the energized entry relays representing a digit to be entered to cause the energization of combining relays representing a digit summation and to effect, if required, a units carry to the next highest order, circuit closing means actuated by said typewriter part for closing the holding circuit of the energized combining relays, circuit closing and opening means actuated by said typewriter part for opening the holding circuit of the register relays representing the previous digit representation to clear out a previous digit registration, while said combining relays are held energized, and circuit controlling means actuated by said typewriter part for causing said circuit means to be operable to cause the energized combining relays to energize the register relays representing the digit summation, said preceding circuit opening and closing means then closing the holding circuit for the energized register relays to retain a representation of the digit summation.

4. In a combined typewriter and relay computer wherein entries are effected by a digit keyboard and said typewriter includes an operating part, entry relays selectively energized under control of said keyboard, a relay type accumulator comprising, for each order, digit representing register relays, combining relays energized under control of said energized entry relays, and a digit summation circuit network and units carry network controlled by said register and combining relays, and said digit summation circuit network having an associated pickup circuit, said combining relays being of the holding type and held by a holding circuit during an entry operation, and said register relays being of the holding type and held energized by a holding circuit to retain a digit representation after an entry operation, circuit means under control of the energized combining relays including a second pickup circuit to energize corresponding register relays in the order in which an entry is made, circuit controlled means controlled by said typewriter part for closing said first named pickup circuit to energize through said summation circuit network the combining relays under control of the corresponding energized entry relays and the energized register relays and thereafter closing the holding circuit for the energized combining relays representing a digit summation, means for closing said second pickup circuit while the holding circuit for the combining relays is closed for energizing the register relays under control of the corresponding energized combining relays, and means for thereafter opening the holding circuit to clear out unwanted register relays and then closing the holding circuit for said register relays while the combining relays are held energized to retain the digit representation in the order in which a summation has been made.

5. In a combined typewriter and relay computer wherein entries are effected by a digit keyboard one digit at a time and said typewriter includes an operating part, entry relays selectively energized under control of said keyboard, a relay type accumulator comprising, for each order, digit representing register relays, combining relays energized under control of said energized entry relays, and a digit summation circuit network and units carry network controlled by said register and combining relays, and said digit summation circuit networks having an associated pickup circuit, said combining relays being of the holding type and held by a holding circuit during an entry operation, and said register relays being of the holding type and held energized in all orders including previously set-up orders by a common holding circuit for the next digit entry operation, circuit means under control of the energized combining relays including a second pickup circuit to energize corresponding register relays in the order in which an entry is made, circuit controlled means controlled by said typewriter part for closing said first-named pickup circuit to energize through said digit summation circuit network combining relays under control of the corresponding energized entry relays and the energized register relays representing a previous registration and thereafter closing the holding circuit for said combining relays, means for closing said second pickup circuit while the holding circuit for the combining relays is closed and before the holding circuit for the register relays is opened for energizing the register relays under control of the corresponding energized combining relays, and means for thereafter opening the holding circuit to clear out unwanted register relays in the order in which an entry is being made and then closing the common holding circuit for said register relays to retain the digit representation in the order in which a summation has been made, said second pickup circuit closing through the digit summation circuits of all previously set-up orders circuits, to energize under control of the energized register relays in those orders, corresponding combining relays, which latter are held energized to retain corresponding register relays energized to prevent their deenergization when said common holding circuit therefor is opened.

6. In a combined typewriter and computing machine wherein said typewriter has a keyboard for typing digits and a platen carriage which is letter-spaced as the digits are typed, the combination of a plurality of series of register relays, one series for each denominational order of an accumulator of the relay type, a plurality of series of digit entry relays, one series for each order, means under control of said keyboard for selecting for energization selected ones of a selected series of entry relays, a plurality of series of digit combining relays, one series for each order, a digit summation circuit network for each order under control of previously energized register relays and the energized entry relays of the same order for energizing combining relays representing the digit summation, circuit means under control of said combining relays for energizing and holding corresponding register relays representing, in the order an entry is being made, the digit summation, a series of denominationally ordered selecting relays, one for each denominational order, and each when energized for causing selected ones of entry relays in the order in which an entry is being made to be energized, and means under control of said platen carriage for causing said selecting relays to be energized in denominational succession as said platen carriage is letter-spaced by typing of the digits to be entered.

7. In a combined typewriter and computing machine wherein said typewriter has a keyboard for typing digits and a platen carriage which is letter-spaced as the digits are typed, a series of digit representing register relays for each denominational order which are of the holding type for retaining a digit representation after a key controlled digit entry, a series of digit entry relays, one series for each denominational order, means under control of said keyboard for energizing selected ones of the selected series of digit entry relays of an order in which an entry is to be made, a plurality of denominationally ordered relays, one for each order, and each when energized for selecting the related series of entry relays, means under control of said carriage to cause said relays to be energized in denominational succession as the digits are typed to cause selected ones of the entry relays to be effective of the series of entry relays selected by the energized relay, a digit summation circuit network for each order and units carry network circuit for the next higher order controlled by the previously energized register relays and the entry relays which are effective in the order an entry is to be made for causing the energization of register relays which represent a digit summation in the order in which an entry is being made, and means for holding the register relays energized for the next digit entry.

8. In a combined typewriter and addition and subtraction relay computer wherein said typewriter has a letter-spaced platen carriage, and a digit keyboard, a relay type accumulator comprising, for each order, register relays of the holding type for retaining a digit registration and digit entry relays representing a digit to be entered, and a digit summation circuit network and units carry network controlled by both of the aforesaid register and entry relays, means controlled by said keyboard for selecting entry relays representing true digits when each digit is to be additively entered, switching means intermediate said keyboard and entry relays for selecting when subtraction is to be performed entry relays representing the 9's complement of the single digit to be entered, means controlled by said platen carriage for causing the energized entry relays, representing either the true or the 9's complement of the digit to be entered to control the digit summation and units carry circuit networks of the accumulator orders in denominational succession as the platen carriage is successively letter-spaced, and circuit means rendered effective by said switching means when subtraction is to be effected to energize under control of said keyboard in each higher and lower accumulator order to the left and right of the order in which a 9's complement digit is entered, digit relays representing the digit 9 to control the digit summation and units carry circuit network in such orders.

9. In a combined typewriter and addition and subtraction relay computer wherein said typewriter has a letter-spaced platen carriage, and a digit keyboard, a relay type accumulator comprising, for each order, register relays of the holding type for retaining a digit registration and digit entry relays representing a digit to be entered, and a digit summation circuit network and units carry network controlled by both of the aforesaid register and entry relays, means controlled by said keyboard for selecting entry relays representing true digits when each digit is to be additively entered, switching means intermediate said keyboard and entry relays for selecting when substraction is to be performed entry relays representing the 9's complement of the single digit to be entered, means controlled by said platen carriage for causing the energized entry relays, representing either the true or the 9's complement of the digit to be entered to control the digit summation and units carry circuit networks of accumulator orders in denominational succession as the platen carriage is successively letter-spaced, circuit means rendered effective by said switching means when subtraction is to be effected to energize under control of said keyboard in each higher and lower accumulator order to the left and right of the order in which a 9's complement digit is entered, digit relays representing the digit 9 to control the digit summation and units carry circuit network in such orders, a circuit controlled by the units carry circuit for said highest denominational order and responsive when said order changes from a 9 to 0 digit representation, and means for connecting said circuit to the units carry circuit network of the units denominational order to carry a fugitive unit in the units order.

10. In a combined typewriter and relay computer, the combination of a traveling platen carriage having columnar and letter spacing movements, a keyboard of said typewriter for typing digits, numeral type bars controlled by said keyboard and including digit solenoids for their operation, a relay type accumulator of successive denominational orders comprising in each order an electrical digit summation circuit arrangement and relays for representing the digit representation in each order, means controlled by said keyboard for entering true digits in said relay type accumulator when addition is to be performed, subtraction conditioning means to cause said keyboard to effect the entry of digits as the 9's complement of each digit in said accumulator, the highest order of said accumulator representing 9 for a negative total in said accumulator, digit readout means controlled by relays for each order of the accumulator and having digit readout circuits, column selection means controlled by said traveling carriage for entering digits in successive denominational order of said accumulator and for reading the digit representation of the readout means in successive denominational order beginning with the highest, a nines complement multiple contact switch between said solenoids and digit readout circuits of said digit readout means, said switch in unoperated position connecting digit circuits of said digit readout means to corresponding ones of said digit solenoids to cause said digit solenoids to type true digits of a positive total, but when operated shifting said circuits to cause the digit readout means to select digit solenoids representing the 9's complement of the digits of a negative total, and means responsive to a 9 digit representation in the readout means of said highest denominational order for operating said switch when a negative total is detected when said traveling carriage is in a position for reading out the readout means in said highest order.

11. In a combined typewriter and relay computer, the combination of a traveling carriage having columnar and letter spacing movements, a keyboard of said typewriter for typing digits, numeral type bars of said typewriter controlled by said keyboard and including digit solenoids for their automatic operation, a relay type accumulator for summation of digit entries comprising for each order digit entry control relays, combining relays, and register relays, and a digit summation circuit network and units carry circuit network controlled by the register relays representing a previous digit accumulation and the entry control relays representing a digit entry to be made for energizing said combining relays, means controlled by said keyboard for selecting said entry relays and other means controlled by said traveling carriage to cause said entry relays to control the summation circuit networks of the accumulator orders in succession as said carriage is letter spaced, circuit means under control of said energized combining relays to pick up and hold register relays representing the digit in each order, readout means controlled by the register relays of each order and including digit representing circuits selected thereby for selecting corresponding digit solenoids to type a total, and means controlled by said carriage for reading out said readout means in denominational succession to cause selected digit circuits, according to the digit representation in each order, to select digit solenoids to type the digits of the total, digit by digit.

12. In a combined typewriter and relay computer, the combination of a traveling carriage having columnar and letter spacing movements, a keyboard of said typewriter for typing digits, numeral type bars of said typewriter controlled by said keyboard and including digit solenoids for their automatic operation, a relay type accumulator for summation of digit entries according to a combinational code comprising for each order digit entry control relays, combining relays, and register relays, and a digit summation circuit network and units carry circuit network controlled by the register relays representing a previous digit accumulation and the entry control relays representing a digit entry to be made for energizing said combining relays, means controlled by said keyboard for selecting said entry relays according to a combinational code and other means controlled by said traveling carriage to cause said entry relays to control the summation circuit networks of the accumulator orders in succession as said carriage is letter spaced, circuit means under control of said energized combining relays to pick up and hold register relays representing according to the combinational code the digit in each order, translator means for translating a combinational representation to a decimal representation controlled by the register relays of each order and including decimal digit representing circuits selected by said translator means for selecting corresponding digit solenoids to type a total, and means controlled by said carriage for reading out said translator means in denominational succession to cause selected digit circuits, according to the digit representation in each order, to select digit solenoids to type the digits of the total, digit by digit.

JAMES W. BRYCE.
JOHN N. WHEELER.

REFERENCES CITED

The following references are of record in the file of this patent:

UNITED STATES PATENTS

| Number | Name | Date |
|---|---|---|
| 1,813,830 | Weiner | July 7, 1931 |
| 1,899,936 | Bricken | Mar. 7, 1933 |
| 1,928,656 | Reppert | Oct. 3, 1933 |
| 1,998,355 | Boutet | Apr. 16, 1935 |
| 2,262,235 | Hofgaard | Nov. 11, 1941 |